US011227271B2

(12) United States Patent
Chen et al.

(10) Patent No.: US 11,227,271 B2
(45) Date of Patent: Jan. 18, 2022

(54) IDENTITY AUTHENTICATION METHOD, DEVICE, AND SYSTEM

(71) Applicant: Advanced New Technologies Co., Ltd., Grand Cayman (KY)

(72) Inventors: Li Chen, Hangzhou (CN); Hong Zhang, Hangzhou (CN); Le Zhou, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 3 days.

(21) Appl. No.: 16/945,362

(22) Filed: Jul. 31, 2020

(65) Prior Publication Data
US 2020/0364684 A1 Nov. 19, 2020

Related U.S. Application Data

(63) Continuation of application No. 16/425,364, filed on May 29, 2019, which is a continuation of application No. PCT/CN2018/086277, filed on May 10, 2018.

(30) Foreign Application Priority Data

May 11, 2017 (CN) .......................... 201710331058.8

(51) Int. Cl.
*G06Q 20/18* (2012.01)
*G06Q 20/20* (2012.01)
(Continued)

(52) U.S. Cl.
CPC .......... *G06Q 20/18* (2013.01); *G06Q 20/206* (2013.01); *G06Q 20/3674* (2013.01); *G06Q 20/40* (2013.01); *G06Q 20/40145* (2013.01)

(58) Field of Classification Search
CPC ...... G06Q 20/40; G06Q 20/18; G06Q 20/206; G06Q 20/3674; G06Q 20/40145; H04W 4/80
See application file for complete search history.

(56) References Cited

U.S. PATENT DOCUMENTS 9,075,979 B1 7/2015 Queru
9,805,370 B1 * 10/2017 Quigley ............. H04L 63/0428
(Continued)

FOREIGN PATENT DOCUMENTS

CN 103150587 6/2013
CN 103685197 3/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Florian M Zeender
*Assistant Examiner* — Vanessa Deligi
(74) *Attorney, Agent, or Firm* — Fish & Richardson P.C.

(57) ABSTRACT

Association information received from a number of mobile devices is recorded at a server end, where each mobile device is associated with a user that is pre-registered with the server end. An identification request is received at the server end and from a cashier device, where the identification request includes identity information associated with a particular user. One or more payment candidates corresponding to the cashier device are determined by the server end. A particular user account corresponding to the particular user is determined by the server end by comparing the identity information from the identification request with identity information associated with each of the payment candidates. The particular user account is returned by the server end to the cashier device for making a payment.

20 Claims, 14 Drawing Sheets

(51) Int. Cl.
*G06Q 20/36* (2012.01)
*G06Q 20/40* (2012.01)

(56) References Cited

U.S. PATENT DOCUMENTS

| | | | | |
|---|---|---|---|---|
| 9,807,726 | B1* | 10/2017 | Nguyen | H04W 4/029 |
| 2004/0226459 | A1 | 11/2004 | Hill et al. | |
| 2009/0138366 | A1 | 5/2009 | Bemmel et al. | |
| 2013/0005243 | A1 | 1/2013 | Royston | |
| 2014/0006191 | A1* | 1/2014 | Shankar | H04W 8/005 705/18 |
| 2014/0370917 | A1* | 12/2014 | Buchheim | H04W 4/026 455/456.1 |
| 2015/0163322 | A1 | 6/2015 | Xie | |
| 2015/0356563 | A1* | 12/2015 | Vohra | G06Q 20/202 705/44 |
| 2015/0371210 | A1* | 12/2015 | Chatterjee | G06Q 20/209 705/21 |
| 2016/0019512 | A1* | 1/2016 | Buchheim | H04W 4/80 705/73 |
| 2016/0063235 | A1* | 3/2016 | Tussy | G06K 9/22 726/6 |
| 2016/0098711 | A1 | 4/2016 | Patel et al. | |
| 2016/0104165 | A1 | 4/2016 | Hanna | |
| 2016/0292677 | A1* | 10/2016 | Karlsson | G06Q 20/20 |
| 2016/0335617 | A1* | 11/2016 | Novack | G06Q 20/202 |
| 2017/0004475 | A1* | 1/2017 | White | G06Q 20/3567 |
| 2017/0238140 | A9 | 8/2017 | Buchheim et al. | |
| 2017/0243188 | A1* | 8/2017 | Mahmoudzadehvazifeh | G06Q 20/204 |
| 2017/0270510 | A1* | 9/2017 | Kattimani | G06Q 20/3278 |
| 2017/0364901 | A1* | 12/2017 | Chandrasekaran | H04B 17/27 |
| 2018/0075445 | A1* | 3/2018 | Pan | G06Q 20/4014 |
| 2018/0114219 | A1* | 4/2018 | Setchell | H04L 9/3231 |
| 2018/0174123 | A1* | 6/2018 | Zhu | G06Q 20/20 |

FOREIGN PATENT DOCUMENTS

| | | |
|---|---|---|
| CN | 204926094 | 12/2015 |
| CN | 105321067 | 2/2016 |
| CN | 105550863 | 5/2016 |
| CN | 102934466 | 7/2016 |
| CN | 105871814 | 8/2016 |
| CN | 108876385 | 11/2018 |
| EP | 1612718 | 11/2010 |
| EP | 2701107 | 2/2014 |
| EP | 3156958 | 4/2017 |
| JP | 2008243054 | 10/2008 |
| JP | 2015190621 | 11/2015 |
| JP | 2015219720 | 12/2015 |
| JP | 201746338 | 3/2017 |
| KR | 100377189 | 3/2003 |
| KR | 101636429 | 7/2016 |
| TW | 201629821 | 8/2016 |
| TW | 201643785 | 12/2016 |
| WO | WO 2017036243 | 3/2017 |

OTHER PUBLICATIONS

Extended European Search Report in European Application No. 18799070.0, dated Nov. 8, 2019, 10 pages.
Nakamoto, "Bitcoin: A Peer-to-Peer Electronic Cash System," www.bitcoin.org, 2005, 9 pages.
PCT International Preliminary Report on Patentability in International Application No. PCT/CN2018/086277, dated Nov. 12, 2019, 8 pages (with English translation).
PCT International Search Report and Written Opinion in International Application No. PCT/CN2018/086277, dated Jul. 31, 2018, 15 pages (with English translation).

* cited by examiner

IDENTITY AUTHENTICATION METHOD, DEVICE, AND SYSTEM

CROSS-REFERENCE TO RELATED APPLICATIONS

This application is a continuation of U.S. patent application Ser. No. 16/425,364, filed on May 29, 2019, which is a continuation of PCT Application No. PCT/CN2018/086277, filed on May 10, 2018, which claims priority to Chinese Patent Application No. 201710331058.8, filed on May 11, 2017, and each application is hereby incorporated by reference in its entirety.

TECHNICAL FIELD

The present application relates to the field of identity authentication technologies, and in particular, to an identity authentication method, device, and system.

BACKGROUND

In related technologies, an interactive operation can be implemented between users. When an interactive operation is implemented between an interactive device and a user equipment, a user of the user equipment obtains interactive objects of interest, and a provider of the interactive object can obtain a corresponding interactive resource from the user by using the interactive operation implemented between the interactive device and the user equipment.

In the related technologies, the user needs to manually operate the user equipment to complete an interactive operation between the user equipment and the interactive device. However, the user may be in an inconvenient situation to operate, for example, the user carries heavy luggage. Consequently, interaction efficiency is relatively low.

SUMMARY

In view of this, the present application provides an identity authentication method, device, and system, to improve user identification efficiency and accuracy, to further improve interaction efficiency and security.

To achieve the previous objective, the present application provides the following technical solutions:

According to a first aspect of the present application, an identity authentication system is provided, including a client device, a payee device, and a server end, where the payee device transmits a near field message, where the near field message includes payee-device identification information of the payee device; the client device sends the payee-device identification information, user identification information of a logged-in user of the client device, and signal strength of the near field message to the server end in response to receiving the near field message; the server end receives the payee-device identification information, the user identification information, and the signal strength that are sent by the client device, and marks the logged-in user as a candidate user corresponding to the payee device in response to determining that the signal strength is greater than predetermined strength; the payee device receives a transaction instruction initiated for the logged-in user, obtains biometric feature information of the logged-in user based on the transaction instruction, and sends an identification request that includes the biometric feature information to the server end; and the server end receives the identification request, matches the biometric feature information against standard biometric feature information of a candidate user corresponding to the payee device, and determines a user account corresponding to the logged-in user, where the user account is used to respond to a transaction operation corresponding to the transaction instruction.

According to a second aspect of the present application, an identity authentication method is provided, including: receiving, by an interactive end, an interactive instruction initiated for a user; obtaining, by the interactive end, identity information of the user; and sending, by the interactive end, an identification request to a server end, where the identification request includes the identity information, where the identification request is used to instruct the server end to match the identity information against standard identity information of a candidate user corresponding to the interactive end, to determine a user account corresponding to the user, where the user account is used to respond to an interactive operation corresponding to the interactive instruction, and where a user near the interactive end is marked as a candidate user corresponding to the interactive end by the server end.

According to a third aspect of the present application, an identity authentication method is provided, including: receiving, by a server end, an identification request sent by an interactive end, where the identification request includes identity information of a user, and where the identity information is obtained by the interactive end from the user based on an interactive instruction initiated for the user; matching, by the server end, the identity information against standard identity information of a candidate user corresponding to the interactive end, where a user near the interactive end is marked as a candidate user corresponding to the interactive end by the server end; and determining, by the server end, a user account corresponding to the candidate user in response to determining that the identity information matches the standard identity information corresponding to the candidate user, where the user account is used to respond to an interactive operation corresponding to the interactive instruction.

According to a fourth aspect of the present application, an identity authentication method is provided, including: receiving, by a client device, a near field message transmitted by an interactive end, where the near field message includes interactive-end identification information of the interactive end; and sending, by the client device, the interactive-end identification information, user identification information of a logged-in user of the client device, and signal strength of the near field message to a server end, so that the server end marks the logged-in user as a candidate user corresponding to the interactive end in response to determining that the signal strength is greater than predetermined strength, where in response to determining that the interactive end obtains an interactive instruction for the logged-in user, identity information of the logged-in user is obtained by the interactive end and is sent to the server end, the server end matches the identity information against standard identity information corresponding to each candidate user, and determines a user account corresponding to the logged-in user, where the user account is used to respond to an interactive operation corresponding to the interactive instruction.

According to a fifth aspect of the present application, an identity authentication device is provided, including: a receiving unit, configured to enable an interactive end to receive an interactive instruction initiated for a user; an acquisition unit, configured to enable the interactive end to obtain identity information of the user; and a sending unit, configured to enable the interactive end to send an identification request to a server end, where the identification request includes the identity information, where the identification request is used to instruct the server end to match the identity information against standard identity information of a candidate user corresponding to the interactive end, to determine a user account corresponding to the user, where the user account is used to respond to an interactive operation corresponding to the interactive instruction, and where a user near the interactive end is marked as a candidate user corresponding to the interactive end by the server end.

According to a sixth aspect of the present application, an identity authentication device is provided, including: a receiving unit, configured to enable a server end to receive an identification request sent by an interactive end, where the identification request includes identity information of a user, and the identity information is obtained by the interactive end from the user based on an interactive instruction initiated for the user; a matching unit, configured to enable the server end to match the identity information against standard identity information of a candidate user corresponding to the interactive end, where a user near the interactive end is marked as a candidate user corresponding to the interactive end by the server end; and a determination unit, configured to enable the server end to determine a user account corresponding to the candidate user in response to determining that the identity information matches the standard identity information corresponding to the candidate user, where the user account is used to respond to an interactive operation corresponding to the interactive instruction.

According to a seventh aspect of the present application, an identity authentication device is provided, including: a receiving unit, configured to enable a client device to receive a near field message transmitted by an interactive end, where the near field message includes interactive-end identification information of the interactive end; and a sending unit, configured to enable the client device to send the interactive-end identification information, user identification information of a logged-in user of the client device, and signal strength of the near field message to a server end, so that the server end marks the logged-in user as a candidate user corresponding to the interactive end in response to determining that the signal strength is greater than predetermined strength, where in response to determining that the interactive end obtains an interactive instruction for the logged-in user, identity information of the logged-in user is obtained by the interactive end and is sent to the server end, the server end matches the identity information against standard identity information corresponding to each candidate user, and determines a user account corresponding to the logged-in user, where the user account is used to respond to an interactive operation corresponding to the interactive instruction.

It can be seen from the previous technical solutions that in the present application, the server end determines users near the interactive end and marks the users as candidate users, and these users only need to provide their identity information for the interactive end so that the server end can automatically determine user accounts corresponding to these users and perform an interactive operation on the determined user account. The user does not need to perform an operation on a user equipment of the user, thereby simplifying a user operation and improving interaction efficiency. In addition, an identification range of identity information (which is limited to the candidate users corresponding to the interactive end) can be narrowed, and the server end performs objective matching in the entire identification process, and no manual identification is involved, thereby improving user identification efficiency and accuracy, further improving interaction security.

DESCRIPTION OF IMPLEMENTATIONS

Figure 1:
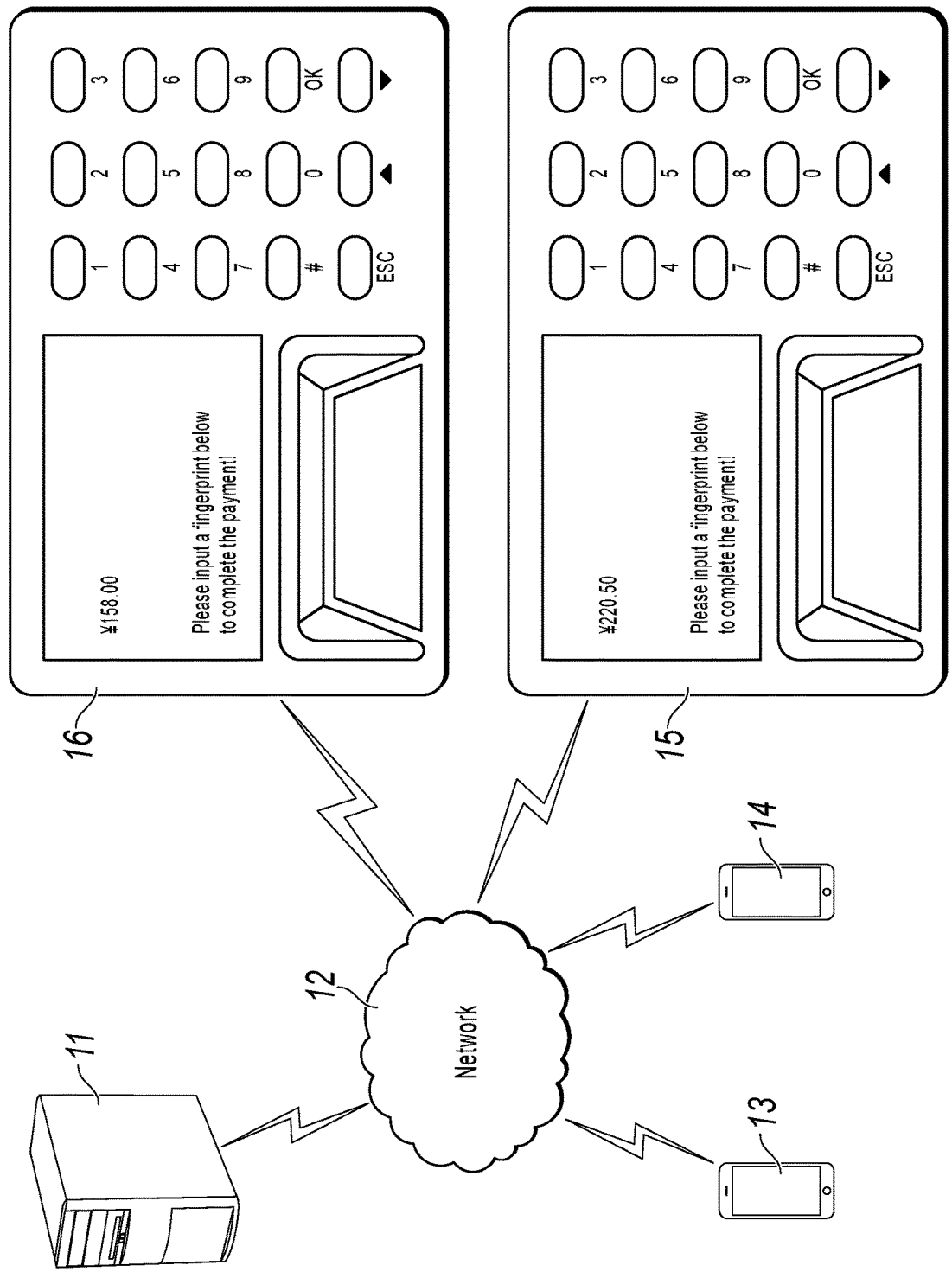
FIG. 1 is a schematic architectural diagram illustrating an identity authentication system, according to an example implementation of the present application.

FIG. 1 is a schematic architectural diagram illustrating an identity authentication system, according to an example implementation of the present application. As shown in FIG. 1, the system can include a server 11, a network 12, several user equipments (such as a mobile phone 13 and a mobile phone 14), and an interactive device (such as a cashier device 15 and a cashier device 16).

The server 11 can be a physical server that includes an independent host, or the server 11 can be a virtual server hosted by a host cluster, or the server 11 can be a cloud server. In a running process, the server 11 can run a program on a server side of a certain application, to implement a related service function of the application. For example, when running an interactive operation program, the server 11 can be configured as a server end configured to implement an interactive function.

The mobile phones 13 and 14 are merely one type of user equipment that can be used by a user. Actually, the user can also use electronic devices of the following types: a tablet device, a notebook computer, a personal digital assistant (PDA), a wearable device (such as a pair of smart glasses or a smartwatch), etc. Implementations are not limited in the present application. In a running process, the user equipment can run a program on a client device side of a certain application, to implement a related service function of the application. For example, when running an interactive operation program, the electronic device can be configured as a client device configured to implement an interactive function.

The cashier devices 15 and 16 are merely one type of interactive device configured to implement an interactive function. Actually, the interactive device may also be a point of sale (POS), etc. Implementations are not limited in the present application. In a running process, the interactive device can run a program on an interactive end side of a certain application, to implement a related service function of the application. For example, when running an interactive operation program, the interactive device can be configured as an interactive end configured to implement an interactive function.

The network 12 in which the mobile phones 13 and 14 and the cashier devices 15 and 16 interact with the server 11 can include a plurality of types of wired or wireless networks. In an implementation, the network 12 can include a public switched telephone network (PSTN) and the Internet. Implementations are not limited in the present application. In another implementation, when the network 12 is used for interaction between the mobile phones 13 and 14 and the cashier devices 15 and 16, the network 12 can include a near-field wireless communications network such as Bluetooth, Wi-Fi, near field communication (NFC), radio frequency identification (RRID), etc. Implementations are not limited in the present application.

It can be seen that in a process of implementing the technical solutions of the application, tripartite interaction between a client device, an interactive end, and a server end is involved. From the perspective of a hardware device, the client device can run on a user equipment (for example, the mobile phones 13 and 14), the interactive end can run on an interactive device (for example, the cashier devices 15 and 16), and the server end can run on the server 11. The technical solutions of the present application are separately described from processing logic of each party and a tripartite interaction process.

Figure 2:
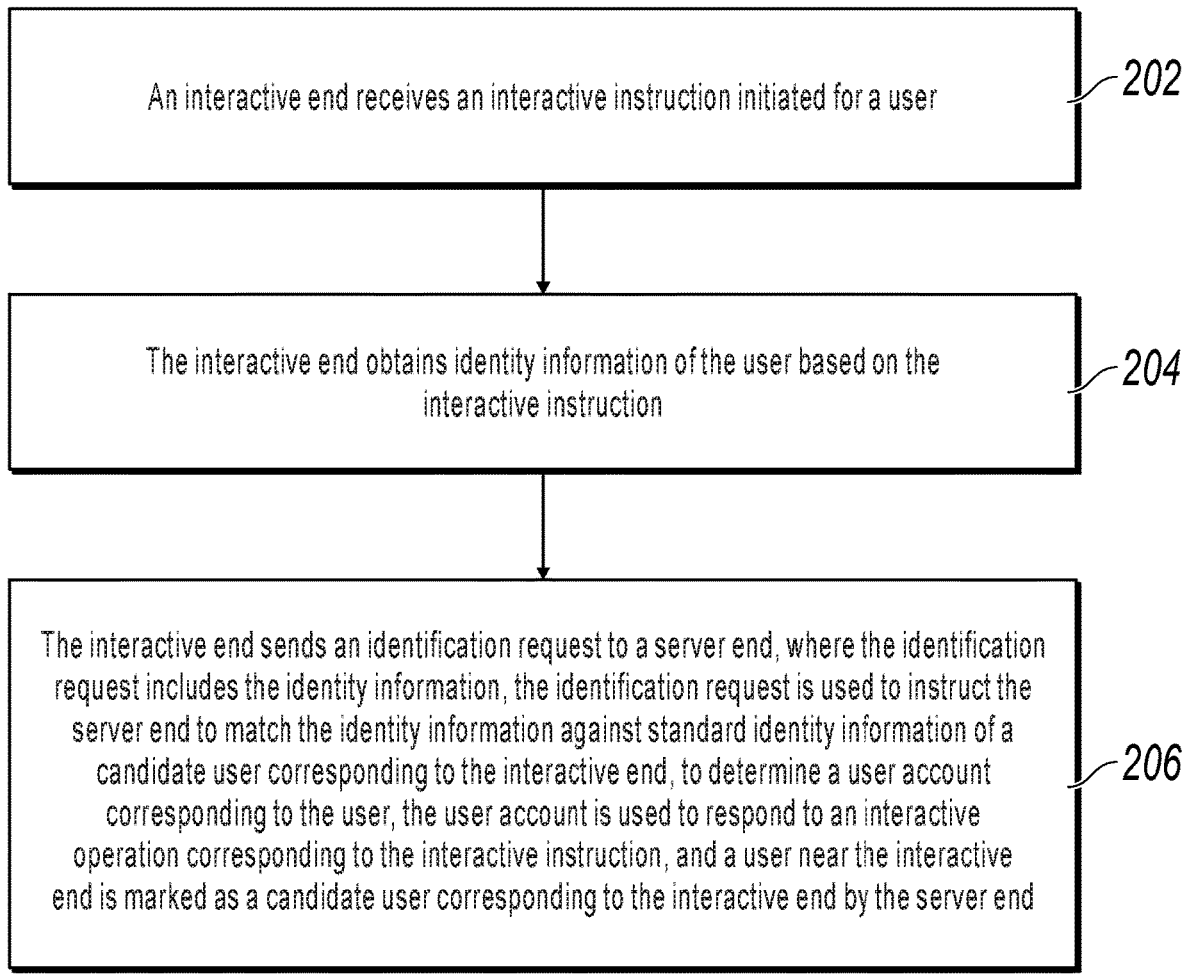
FIG. 2 is a flowchart illustrating an identity authentication method on an interactive end side, according to an example implementation of the present application.

FIG. 2 is a flowchart illustrating an identity authentication method on an interactive end side, according to an example implementation of the present application. As shown in FIG. 2, the method is applied to an interactive end, and can include the following steps.

Step 202: The interactive end receives an interactive instruction initiated for a user.

In the present implementation, the interactive end can actively generate an interactive instruction, or the interactive end can receive an interactive instruction sent by another associated device.

Step 204: The interactive end obtains identity information of the user based on the interactive instruction.

In the present implementation, the identity information is identity information of the user that is obtained by the interactive end based on the interactive instruction, and the identity information uniquely corresponds to the user.

In the present implementation, the identity information may be any type of information. Implementations are not limited in the present application. For example, the identity information can include password information entered by the user. For another example, the identity information can include biometric feature information, and standard identity information can include standard biometric feature information. For example, the biometric feature information and the standard biometric feature information each can include at least one of the following: face information, fingerprint information, palm print information, eye print information, iris information, gait information, etc. Implementations are not limited in the present application.

Step 206: The interactive end sends an identification request to a server end, where the identification request includes the identity information, the identification request is used to instruct the server end to match the identity information against standard identity information of a candidate user corresponding to the interactive end, to determine a user account corresponding to the user, the user account is used to respond to an interactive operation corresponding to the interactive instruction, and a user near the interactive end is marked as a candidate user corresponding to the interactive end by the server end.

In the present implementation, the server end can pre-obtain and record user accounts, standard identity information, etc. corresponding to all users, so that after matching the identity information against the standard identity information, the server end can determine, based on standard identity information that matches the identity information, a user account corresponding to the identity information, that is, a user account corresponding to the standard identity information that matches the identity information. As such, a client device on the interactive end performs an interactive operation on the determined user account.

The server end can provide an account registration service for a user, so that when each user registers a user account of the user, the user account, standard identity information, etc. of the user can be associated with and recorded on the server end. As such, the server end subsequently identifies a corresponding user by matching the standard identity information against identity information.

In the present implementation, when the user account corresponding to the user is determined, the interactive end can receive the user account returned by the server end, and then perform an interactive operation on the determined user account in response to the interactive instruction. When responding to the interactive instruction, the interactive end can initiate a corresponding interactive request to the server end, so that the server end performs interaction for the user account. Alternatively, the interactive end can initiate an interactive request to another interactive server end that is different from the server end, so that the another interactive server end performs interaction for the user account. In addition, when the server end can perform interaction for the user account, after determining the user account, the server end can actively complete the interaction based on interactive data notified by the interactive end, the interactive end does not need to separately send the interactive request, and there is even no need to notify the interactive end of the user account. As such, the user account cannot be leaked, and an association between the user and the user account cannot be exposed, thereby improving interaction security.

In the present implementation, the interactive end can transmit a near field message. The near field message includes interactive-end identification information of the interactive end. The near field message can be transmitted based on a Bluetooth technology, and therefore the near field message can be an announcement frame message. Alternatively, the near field message can be transmitted based on any other near field communications technology such as WiFi, NFC, and RFID. Implementations are not limited in the present application. Certainly, the near field message can be sent in a broadcast way, that is, the near field message is a near field broadcast message, or can be sent in a way other than the broadcast way. Implementations are not limited in the present application.

Further, when the near field message is received by a client device corresponding to the user (for example, a logged-in user), the near field message is used to instruct the client device to send the interactive-end identification information (included in the near field message), user identification information of the user, and signal strength (for example, a received signal strength indicator (RSSI)) of the near field message to the server end, so that the server end marks the user as a candidate user corresponding to the interactive end when the signal strength is greater than predetermined strength. Because the signal strength is inversely related to a distance, it can be ensured that the server end marks a user near the interactive end as a candidate user corresponding to the interactive end.

In the present implementation, because a user (and a client device corresponding to the user) is usually in a moving process, the candidate user can further include a user near the interactive end within a predetermined duration, to ensure timeliness of the "candidate user". The interactive end can continuously and repeatedly transmit the near field message, and after receiving the near field message, the client device can repeatedly send the associated interactive-end identification information, user identification information, and signal strength of the near field message to the server end, so that the candidate user corresponding to the interactive end can be updated, to ensure timeliness of the candidate user.

Figure 3:
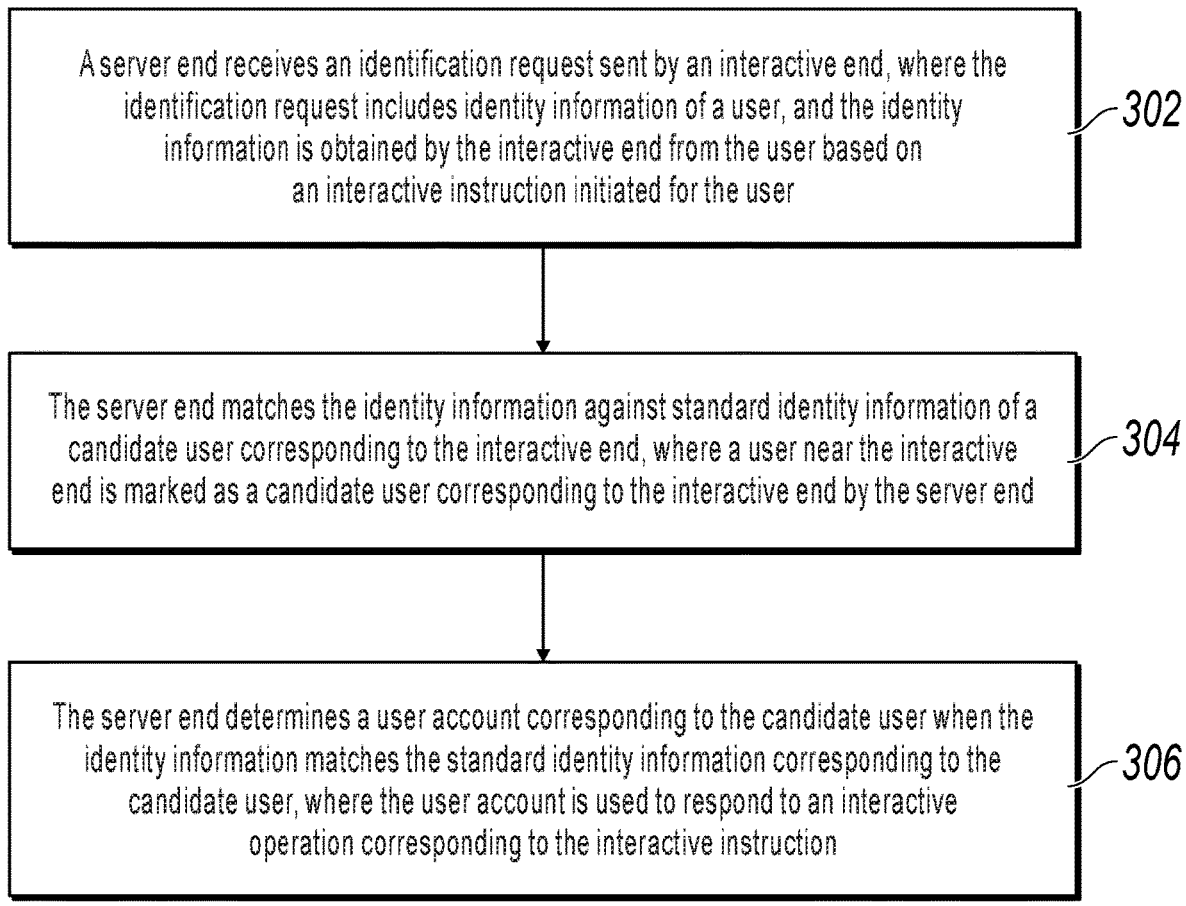
FIG. 3 is a flowchart illustrating an identity authentication method on a server end side, according to an example implementation of the present application.

FIG. 3 is a flowchart illustrating an identity authentication method on a server end side, according to an example implementation of the present application. As shown in FIG. 3, the method is applied to a server end, and the method can include the following steps:

Step 302: The server end receives an identification request sent by an interactive end, where the identification request includes identity information of a user, and the identity information is obtained by the interactive end from the user based on an interactive instruction initiated for the user.

Step 304: The server end matches the identity information against standard identity information of a candidate user corresponding to the interactive end, where a user near the interactive end is marked as a candidate user corresponding to the interactive end by the server end.

In the present implementation, the server end can determine the candidate user corresponding to the interactive end after receiving the identification request. Alternatively, the server end can pre-generate (for example, periodically generate) the candidate user corresponding to the interactive end instead of determining the candidate user after receiving the identification request, to reduce a delay of responding to the identification request.

In the present implementation, the server end can determine the user near the interactive end in a plurality of ways, to mark the user as a candidate user corresponding to the interactive end. In one case, the server end can obtain positioning information (for example, positioning information generated by using a positioning module of the Global Positioning System (GPS) or the BeiDou Navigation Satellite system, or positioning information obtained based on an indoor positioning technology) of a client device, and compare the positioning information with an installation location information of the interactive end, to determine the user near the interactive end.

In another case, the server end can invoke a database, and the database records interactive-end identification information, user identification information, and signal strength that are uploaded by a client device corresponding to the user. When receiving a near field message transmitted by the interactive end, the client device uploads the user identification information of the user, the interactive-end identification information of the interactive end that is included in the near field message, and the signal strength of the near field message to the server end for recording in the database. The server end can receive the interactive-end identification information, the user identification information, and the signal strength that are uploaded by the client device, and mark the user as a candidate user corresponding to the interactive end when the signal strength is greater than predetermined strength.

Further, because a user (and a client device corresponding to the user) is usually in a moving process, the candidate user can further include a user near the interactive end within a predetermined duration, to ensure timeliness of the "candidate user". In particular, when the server end uses the previous "database"-based implementation, the server end can perform life cycle management on association information in the database. For example, the server end actively deletes association information that is stored in the database for more than predetermined duration 1, so as to satisfy timeliness of the "candidate user".

In the present implementation, when the identity information matches the standard identity information corresponding to the candidate user, the server end can notify the interactive end of a user account corresponding to the candidate user, so that the interactive end performs an interactive operation on the user account corresponding to the candidate user in response to the interactive instruction. When the server end can support an interactive function, the interactive end can initiate an interactive request to the server end, so that the server end completes the interactive operation. Alternatively, when the server end supports an interactive function, after determining the user account, the server end can actively perform the interactive operation without the interactive end needing to initiate an interactive request, and even the server end needing to send the user account to the interactive end. As such, the user account cannot be leaked, and an association between the user and the user account cannot be exposed, thereby improving interaction security.

In the present implementation, "matching" can be understood as that a similarity between the identity information and the standard identity information is greater than a predetermined similarity. When there are a plurality of pieces of standard identity information, the server end can match the identity information against standard identity information corresponding to each candidate user to obtain a corresponding similarity. When a highest similarity is greater than a predetermined similarity threshold, and a difference between the highest similarity and a second highest similarity is greater than a predetermined confounding difference value, that is, when a confounding factor of another user is excluded, it is determined that a candidate user corresponding to the highest similarity matches the user.

Figure 4:
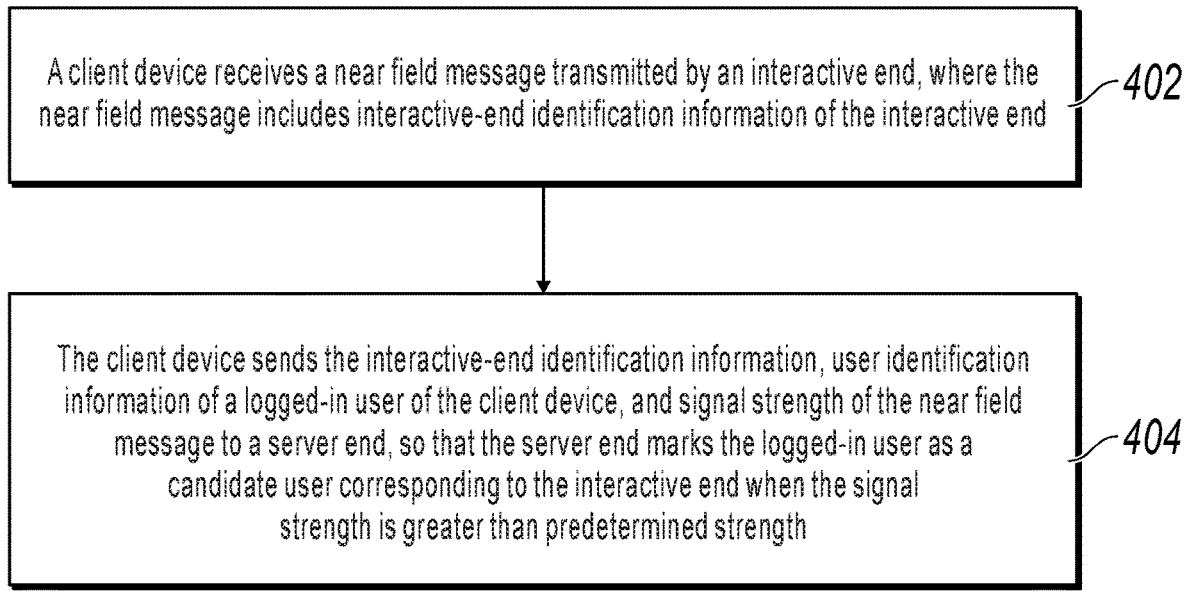
FIG. 4 is a flowchart illustrating an identity authentication method on a client device side, according to an example implementation of the present application.

FIG. 4 is a flowchart illustrating an identity authentication method on a client device side, according to an example implementation of the present application. As shown in FIG. 4, the method is applied to a client device, and can include the following steps.

Step 402: The client device receives a near field message transmitted by an interactive end, where the near field message includes interactive-end identification information of the interactive end.

Step 404: The client device sends the interactive-end identification information, user identification information of a logged-in user of the client device, and signal strength of the near field message to a server end, so that the server end marks the logged-in user as a candidate user corresponding to the interactive end when the signal strength is greater than predetermined strength.

In the present implementation, when the interactive end obtains an interactive instruction for the logged-in user, the identity information of the logged-in user can be obtained by the interactive end and sent to the server end, so that the server end matches the identity information against standard identity information corresponding to the candidate user, and determines a user account corresponding to the logged-in user. The user account is used to respond to an interactive operation corresponding to the interactive instruction.

In the present implementation, the interactive end can continuously and repeatedly (for example, periodically) transmit the near field message, and the client device can send the associated interactive-end identification information, user identification information, and signal strength to the server end each time receiving the near field message, so that the candidate user corresponding to the interactive end can be updated, to adapt to a dynamic feature of a user. Certainly, to reduce power consumption caused by data reception and transmission, the client device can identify an interactive end that transmits a near field message (for example, by reading interactive-end identification information included in the near field message), so that after the client device receives a near field message transmitted by the interactive end and sends associated interactive-end identification information, user identification information, and signal strength to the server end based on the near field message, if another near field message from the interactive end is received within a predetermined duration 2, the client device can ignore the newly received near field message. When the server end uses the life cycle management mechanism described above, the predetermined duration 2 used by the client device should not be greater than the predetermined duration 1 used by the server end to implement the life cycle management mechanism, to ensure that when the client device is located near the interactive end, the server end can mark the logged-in user who uses the client device as a candidate user of the interactive end.

It can be seen from the previous technical solutions that in the present application, the server end determines users near the interactive end and marks the users as candidate users, and these users only need to provide their identity information for the interactive end so that the server end can automatically determine user accounts corresponding to these users and perform an interactive operation on the determined user account. The user does not need to perform an operation on a user equipment of the user, thereby simplifying a user operation and improving interaction efficiency. In addition, an identification range of identity information (which is limited to the candidate users corresponding to the interactive end) can be narrowed, the server end performs objective matching in the entire identification process, and no manual identification is involved, thereby improving user identification efficiency and accuracy, further improving interaction security.

In the technical solutions of the present application, any interactive operation can be performed by using the identity authentication method in the present application, and falls within the protection scope of the technical solutions of the present application. For example, the interactive operation can include information exchange, data exchange, resource exchange, etc. The resource exchange is used as an example. In a specific scenario, the technical solutions of the present application can be applied to a transaction process. For example, a store provides an item resource used for a transaction, a buyer provides an object resource (for example, a fund or exchange code) used for a transaction, and therefore resource exchange between the item resource and the object resource is implemented between the store and the buyer.

Figure 5:
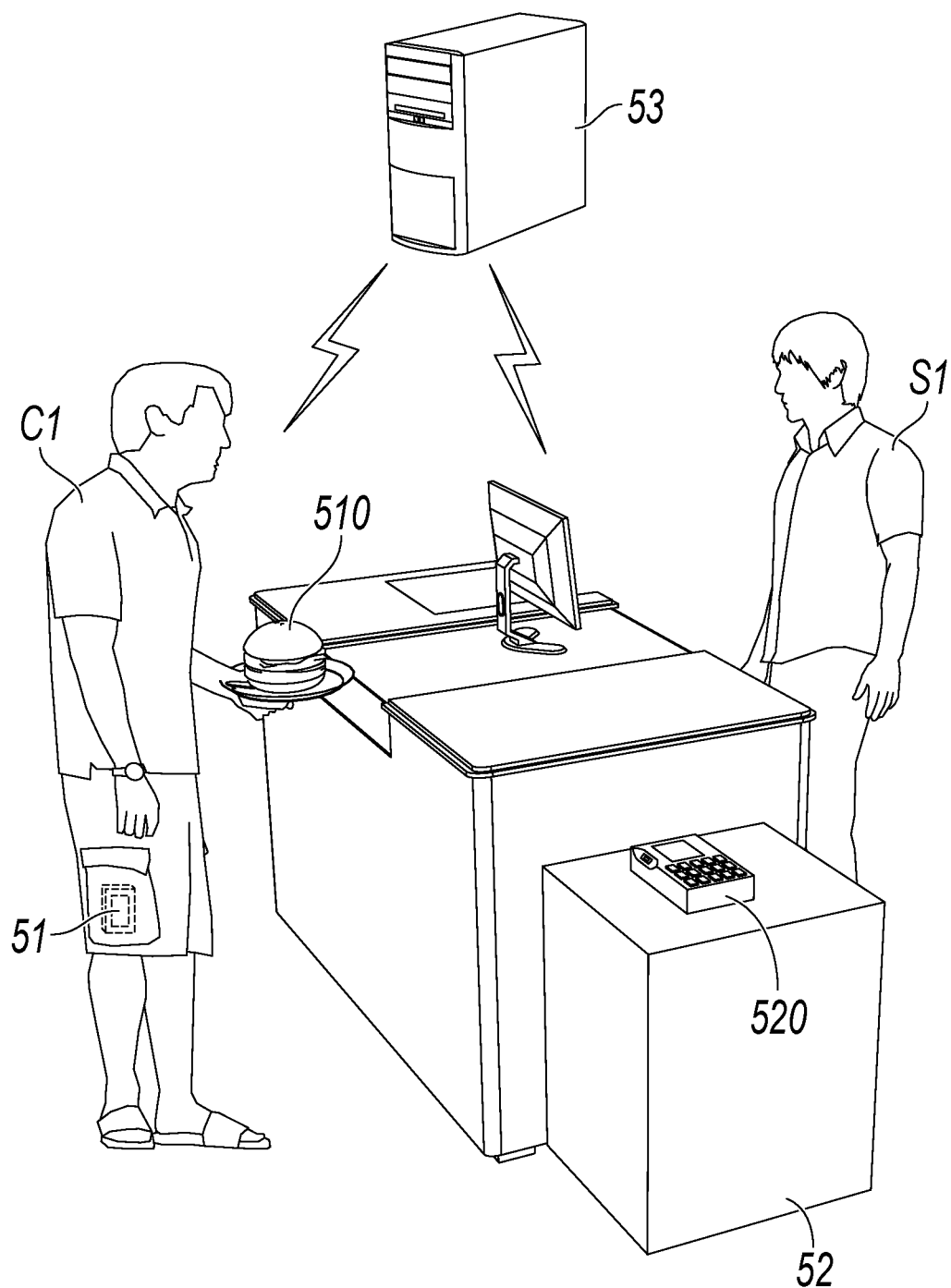
FIG. 5 is a schematic diagram illustrating a transaction scenario, according to an example implementation of the present application.

For ease of understanding, the technical solutions of the present application are described below by using a transaction scenario as an example. As shown in FIG. 5, assume that user C1 goes shopping at a supermarket. When checking out, user C1 goes to a cashier counter with a selected item 510, and cashier S1 receives money for the item 510. A price tag (for example, in a form of a bar code) is usually appended to the item 510. Cashier S1 reads the price tag by using a price tag collection device (for example, a bar code reader) on a cashier device 52, and the cashier device 52 initiates a transaction instruction for user C1 based on the read price.

When a payment is made based on a related technology, user C1 needs to take out a mobile phone 51 (or another type of electronic device), and display payment code (for example, in a form of quick response code) on the mobile phone 51. Content of the payment code is related to a user account of user C1, so that the cashier device 52 can complete a transaction for the user account, in other words, complete deduction from the user account. However, user C1 needs to perform various operations on the mobile phone 51 in the previous process, causing inconvenience to user C1, and user C1 is not always able to smoothly complete an entire operation. For example, when user C1 in FIG. 5 holds the item 510 in the right hand, the user needs to take the mobile phone 51 out of the right pocket only by using the left hand, or the user needs to put the item 510 down and take out the mobile phone 51 with the right hand. Consequently, the entire payment process of user C1 is not smooth, and other users need to wait for a longer time.

However, based on the technical solutions of the present application, user C1 can complete the entire payment process without performing any operation on the mobile phone 51, thereby simplifying a user operation and improving transaction efficiency. In the entire payment process, an interactive operation can be automatically implemented between the mobile phone 51, the cashier device 52, and a server 53, to quickly complete the payment.

Figure 6:
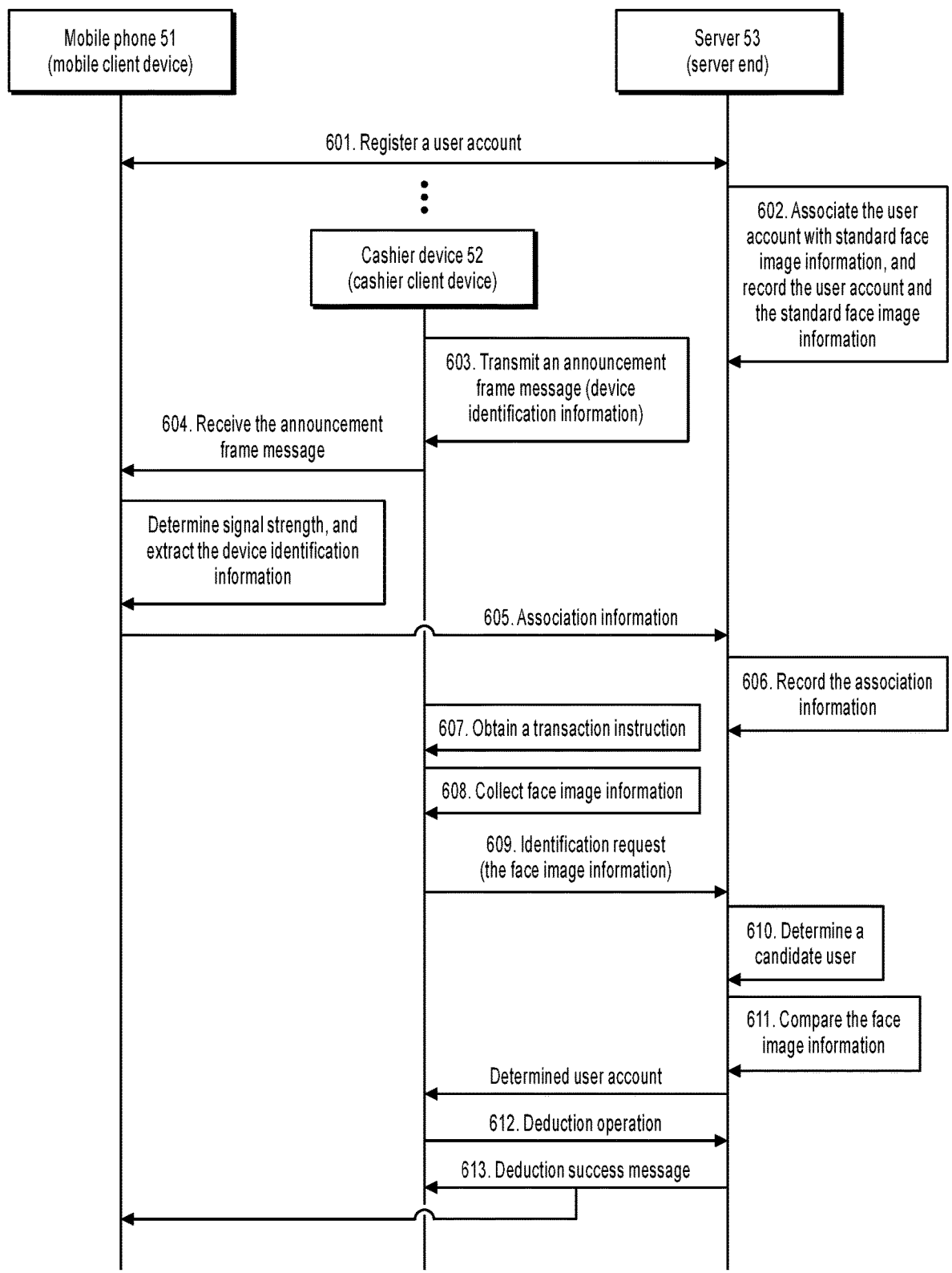
FIG. 6 is a transaction flowchart, according to an example implementation of the present application.

FIG. 6 is a transaction flowchart, according to an example implementation of the present application. As shown in FIG. 6, a mobile client device with a predetermined application program runs on a mobile phone 51, a cashier client device with a predetermined application program runs on a cashier device 52, and a server end with a predetermined application program runs on a server 53. The mobile phone 51, the cashier device 52, and the server 53 can implement the technical solutions of the present application by using the mobile client device, the cashier client device, and the server end. The predetermined application program can be any payment application. Certainly, implementations are not limited in the present application. For ease of understanding, the following provides description by using processing actions performed by each of the mobile phone 51, the cashier device 52, and the server 53, or interactive operations thereof without emphasizing the mobile client device, the cashier client device, and the server end. The transaction process can include the following steps.

Step 601: User C1 pre-registers a corresponding user account with the server 53 by using the mobile client device on the mobile phone 51.

In the present implementation, user C1 needs to have a uniquely corresponding user account on the server 53. The user account is related to a fund account of user C1, so that a corresponding fund is deducted/paid from the fund account of user C1 by using the user account. Generally, when run by user C1 for the first time, the mobile client device can guide user C1 in completing account registration. Certainly, user C1 can complete a registration operation on another occasion or in another scenario based on an actual situation. Implementations are not limited in the present application. In addition, user C1 can complete the previous account registration operation by using a personal computer (PC) or another device, and log in to the account on the mobile phone 51. Alternatively, user C1 can bind, to an application program corresponding to the mobile client device, a user account registered by user C1 in another application program, to omit an account registration process and simplify an operation of user C1. Actually, any method for creating a uniquely corresponding user account for user C1 in the application program corresponding to the mobile client device can be applied to the technical solutions of the present application. Implementations are not limited in the present application.

In the present implementation, an application program of the mobile client device can be pre-installed on the mobile phone 51, so that the mobile client device can be started and run on the mobile phone 51. Certainly, when an online "client device" is used, for example, in an HTML5 technology, the mobile client device can also be run without installing a corresponding application program on the mobile phone 51. Implementations are not limited in the present application. Actually, the cashier client device running on the cashier device 52, etc. are similar to the mobile client device, and details are omitted here for simplicity.

Step 602: The server 53 associates the user account with standard face image information, and records the user account and the standard face image information.

In the present implementation, when user C1 registers the user account by using the mobile client device running on the mobile phone 51, the mobile client device can obtain face image information of user C1 in a registration process, and use the face image information as standard face image information corresponding to the user account registered by user C1. In other words, the server 53 can subsequently identify whether a certain user is user C1 by using the standard face image information as a determination criterion.

Certainly, when a user account registered on the PC is used, or when registration is performed on the mobile client device without enabling a face image information collection function, or when the user account registered in the another application program is used, user C1 can independently enable the face image information collection function on the mobile client device, and associate collected standard face image information with the user account of user C1. In other words, the standard face image information may not be collected in the user account registration process.

In addition to user C1, all users corresponding to the previous predetermined application program can obtain uniquely corresponding user accounts in the predetermined application program in a method similar to the previous method of user C1, and record associated standard face image information on the server 53.

Step 603: The cashier device 52 transmits an announcement frame message, where the announcement frame message includes device identification information of the cashier device 52.

In the present implementation, the cashier device 52 can transmit the announcement frame message based on a Bluetooth communications technology. The announcement frame message includes the device identification information of the cashier device 52, to indicate a source device of the announcement frame message. For example, the device identification information can be included in a single field in the announcement frame message, for example, a universally unique identifier (UUID). Alternatively, the device identification information can be represented by a plurality of fields in the announcement frame message, for example, a UUID, a major parameter, a minor parameter, etc. jointly constitute the device identification information of the cashier device 52.

Step 604: The mobile phone 51 receives the announcement frame message transmitted by the cashier device 52.

Step 605: The mobile phone 51 determines signal strength of the received announcement frame message, extracts the device identification information included in the announcement frame message, and uploads association information that includes user identification information (corresponding to the user account of user C1, for example, the user account or other information), the device identification information, and the signal strength to the server 53 based on the user account of user C1 that is logged in to on the mobile phone 51.

Figure 7:
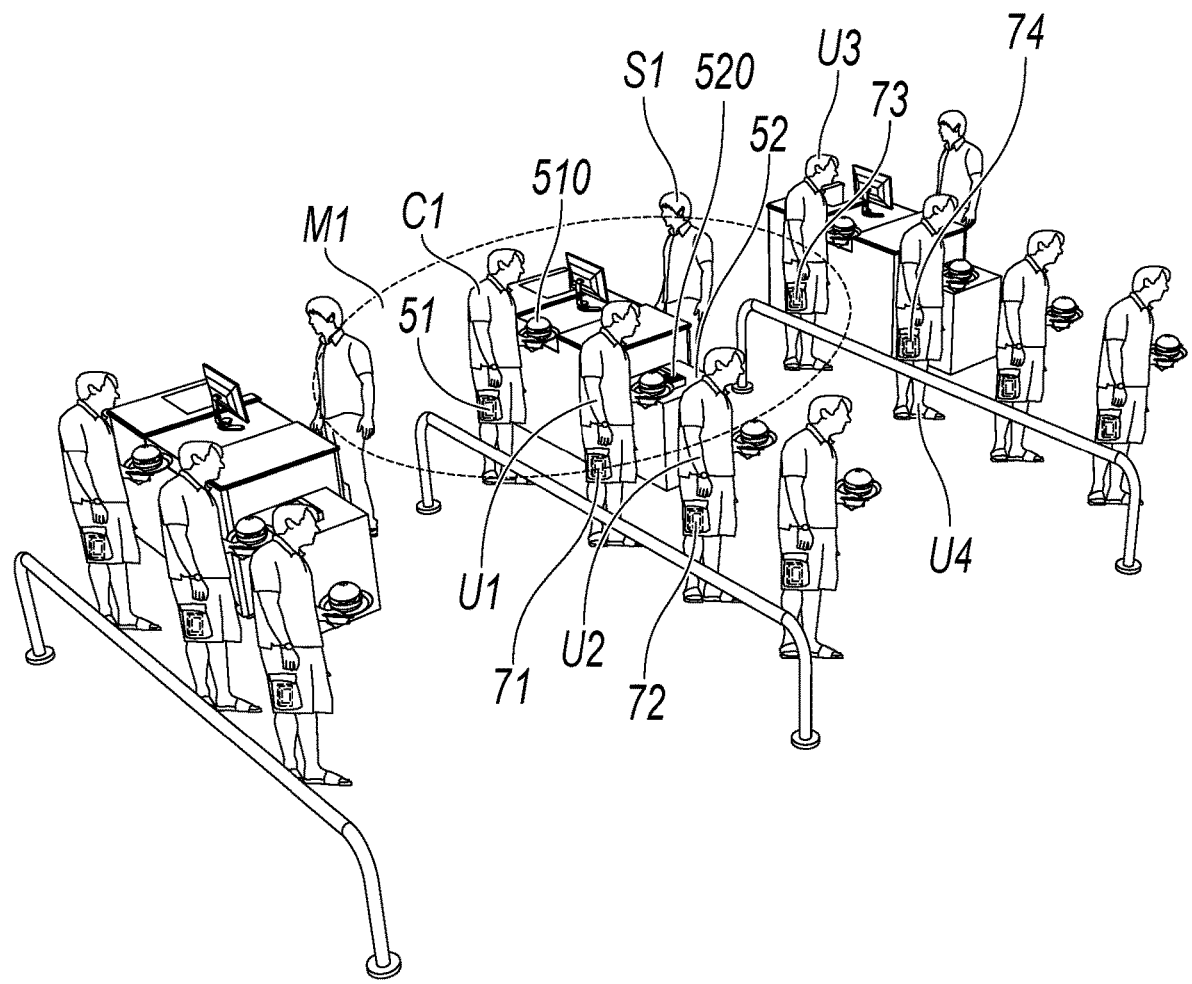
FIG. 7 is a schematic diagram illustrating another transaction scenario, according to an example implementation of the present application.

In the present implementation, a transaction scenario shown in FIG. 7 is used as an example. Assume that user C1 is in a transaction scenario of shopping at a supermarket. When user C1 makes a payment by using the cashier device 52, other users such as user U1 and user U2 may also wait for the cashier device 52 to make a payment. Near the cashier devices 52, there are usually other cashier devices and other users who wait for these cashier devices to make a payment, in other words, there are a plurality of users around the cashier device 52. The cashier device 52 needs to automatically identify identity information of user C1, and determine the user account corresponding to user C1 when user C1 does not actively take out the mobile phone 51 and indicate an identity (the other cashier devices also need to identify user accounts corresponding to their own users who need to make a payment, and details are omitted here for simplicity).

To effectively identify a user, each cashier device can transmit an announcement frame message that includes device identification information of the cashier device. For example, the cashier device 52 transmits a corresponding announcement frame message in step 603. Certainly, the cashier device 52 can continuously transmit the announcement frame message in a specific period, to adapt to dynamic update of surrounding users.

The announcement frame message is a near field message and has a specific coverage area M1, and therefore only a user equipment within the coverage area M1 can receive the announcement frame message. The cashier device 52 shown in FIG. 7 is used as an example, and user equipments within the coverage area M1 can include the mobile phone 51 of user C1, a mobile phone 71 of user U1, a mobile phone 72 of user U2, a mobile phone 73 of user U3, a mobile phone 74 of user U4, etc. A size of the coverage area M1 can be controlled by adjusting parameters such as transmit power of the announcement frame message. When there is a relatively small coverage area M1, a quantity of user equipments that receive the announcement frame message can be effectively reduced, and a quantity of subsequently determined candidate users can be reduced, thereby improving transaction efficiency. However, when there is a relatively long distance between a standing position of a user and a cashier device, a user equipment used by a user may not effectively receive the announcement frame message due to an excessively small coverage area M1, or excessive user equipments receive the announcement frame message due to an excessively large coverage area M1, which may reduce subsequent transaction efficiency. As such, proper transmit power should be selected based on an actual situation, to ensure a coverage area M1 with an appropriate size.

Step 606: The server 53 receives the association information sent by the mobile phone 51, and records the received association information.

In the present implementation, not only the mobile phone 51 sends the association information, but also all user equipments that receive the announcement frame message send association information to the server 53, and the server 53 records the association information. The server 53 can record the received association information in any preconfigured storage space, for example, in an associated database.

In the present implementation, the server 53 can record the association information by using a searchable data structure, to improve subsequent data search efficiency and further improve overall transaction efficiency. For example, an association information table can be created. The server 53 records each piece of received association information as one piece of corresponding data in the association information table. For a data structure of each piece of data, device identification information (for example, a UUID, a major parameter, or a minor parameter) and user identification information can be used as a primary key, and signal strength can be used as a value, making it easy to search for each piece of data in the association information table. For the created association information table, when receiving the association information, the server 53 can search the association information table based on the device identification information and the user identification information that are included in the association information. If there is matching data, a value of the data can be overwritten based on the association information, to update the data. If there is no matching data, a new primary key can be added to the association information table to create a new piece of data.

Step 607: The cashier device 52 obtains a transaction instruction.

In the present implementation, the cashier device 52 can include a price acquisition device. The price acquisition device can generate a transaction instruction for user C1 after reading prices of all items (for example, the item 510) carried by user C1, to trigger a transaction operation for user C1. For example, the price acquisition device can include a bar code reader, and the item 510 can include a bar code indicating a price of the item. The price acquisition device can learn of the price of the item 510 by reading the bar code. Alternatively, the price acquisition device can include an RFID reader, and the item 510 can include an RFID tag indicating a price. The RFID tag can transmit price indication information (for example, commodity information of the item 510, or a price) to the RFID reader, so that the RFID reader learns of the price of the item 510. Alternatively, the price of the item 510 can be learned of in any other way. Implementations are not limited in the present application.

Certainly, the price acquisition device is not necessarily integrated in the cashier device 52. After learning of the price of each item carried by user C1, the price acquisition device can send a notification message to the cashier device 52. The cashier device 52 can generate a transaction instruction based on the notification message, or the notification message can be used as a transaction instruction.

Step 608: The cashier device 52 collects face image information of user C1.

In the present implementation, the cashier device 52 can include an identity information collection device 520. When user C1 makes a payment by using the cashier device 52, the identity information collection device 520 can collect the face image information of user C1.

In the present implementation, the identity information collection device 520 collects any type of user identity information, but it should be ensured that the server 53 records standard user identity information of a corresponding information type in step 602. For example, when the standard user identity information recorded by the server 53 is standard face image information, the identity information collection device 520 should also collect corresponding face image information. When the standard user identity information recorded by the server 53 is standard fingerprint information, the identity information collection device 520 should also collect corresponding fingerprint information.

Certainly, in addition to biometric feature information such as the face image information and the fingerprint information, other non-biometric feature information can also be used as the user identity information here. Implementations are not limited in the present application.

Step 609: The cashier device 52 sends an identification request to the server 53, where the identification request includes the face image information of user C1.

Step 610: The server 53 determines a candidate user corresponding to the cashier device 52.

In the present implementation, when receiving the identification request, the server 53 can determine that the identification request comes from the cashier device 52. As such, the server 53 searches recorded association information (for example, the previous association information table) by using the device identification information of the cashier device 52 as a keyword, to determine association information that matches the cashier device 52.

In the present implementation, the user equipment sends the association information to the server 53 only when receiving the announcement frame message transmitted by the cashier device 52. However, the announcement frame message has the specific coverage area M1. Consequently, user equipments used by users who are located outside the coverage area M1 and far away from the cashier device 52 cannot receive the announcement frame message transmitted by the cashier device 52, and do not send association information related to the cashier device 52 to the server 53. As such, these users are not determined as candidate users of the cashier device 52. FIG. 7 is used as an example. Only user C1, user U1, user U2, user U3, and user U4 upload the association information related to the cashier device 52 to the server 53.

In some cases, the server 53 can directly determine user C1, user U1, user U2, user U3, and user U4 as candidate users corresponding to the cashier device 52.

In other cases, the server 53 can perform screening. Association information includes signal strength of an announcement frame message, and the signal strength is inversely related to a distance. Because there is a relatively short distance between the mobile phone 51 and the cashier device 52, and there is a relatively long distance between the mobile phone 72 and the cashier device 52, for the announcement frame message transmitted by the cashier device 52, signal strength recorded by the mobile phone 51 is relatively strong, and signal strength recorded by the mobile phone 72 is relatively weak. Therefore, the server 53 can obtain, through screening based on signal strength recorded in each piece of association information, a user whose signal strength is greater than predetermined strength, in other words, a user whose distance from the cashier device 52 is within a predetermined distance; screen out a user whose signal strength is less than the predetermined strength, in other words, a user whose distance from the cashier device 52 exceeds the predetermined distance; and use the user obtained through screening as a candidate user corresponding to the cashier device 52, to minimize a quantity of candidate users. FIG. 7 is used as an example. For user C1, user U1, user U2, user U3, and user U4, the server 53 can further screen out user U2, user U3, and user U4, and determine that user C1 and user U1 are candidate users corresponding to the cashier device 52.

In the present implementation, there is a specific time limit requirement for a transaction operation. For example, when user C2 makes a payment by using the cashier device 52, a user equipment used by user C2 can receive the announcement frame message sent by the cashier device 52, and send corresponding association information to the server 53. After user C2 completes the payment and leaves, if the server 53 always records the association information, user C2 may be repeatedly determined as a candidate user of the cashier device 52. Consequently, subsequent transaction efficiency of a user is affected. In particular, as more users make a payment by using the cashier device 52, the server 53 determines more candidate users corresponding to the cashier device 52. Consequently, transaction efficiency becomes lower.

Therefore, the server 53 can introduce a life cycle management mechanism for the recorded association information, to appropriately delete, for example, the association information sent by user C2, so that user C2 is not incorrectly determined as a candidate user. For example, when recording each piece of association information, the server 53 can record corresponding storage duration, and actively delete association information whose storage duration reaches predetermined duration. Because the cashier device 52 continuously transmits the announcement frame message, if user C2 is near the cashier device 52, the user equipment used by user C2 uploads corresponding association information to the server 53 because user C2 receives the announcement frame message. As such, the association information uploaded by user C2 is updated, corresponding storage duration is also updated, and therefore user C2 is determined as a candidate user corresponding to the cashier device 52. If user C2 leaves the cashier device 52, the user equipment used by user C2 cannot receive the announcement frame message, and cannot update the association information recorded on the server 53. Consequently, the association information sent by user C2 is automatically deleted by the server 53 after a timeout, that is, the storage duration reaches the predetermined duration, and user C2 cannot continue to be determined as a candidate user corresponding to the cashier device 52.

For example, when the server 53 records association information by using the previous association information table, when inserting received association information into the association information table and using the association information as one piece of data, the server 53 can obtain a timestamp of an insertion moment of the association information, and use the timestamp and the signal strength as a value of the data. In this case, the server 53 can determine corresponding storage duration by reading only a timestamp recorded in each piece of data and with reference to a current moment, to actively delete association information whose storage duration reaches the predetermined duration.

Step 611: The server 53 compares the face image information with standard face image information of the candidate user, determines the user account of user C1, and notifies the cashier device 52 of the user account.

In the present implementation, the server 53 can compare the face image information with standard face image information of n candidate users, calculate a similarity between the face image information and standard face image information of each candidate user, and obtain a corresponding similarity set[$sim\_score_1$, $sim\_score_2$, . . . , $sim\_score_n$].

In one case, the server 53 can compare each similarity with a predetermined similarity threshold. If only a single similarity is greater than the predetermined similarity threshold, it can be determined that the face image information matches standard face image information corresponding to the similarity. As such, a candidate user corresponding to the standard face image information corresponding to the similarity is determined as user C1, and a user account corresponding to the candidate user is determined as the user account of user C1.

In another case, when there are a plurality of similarities greater than the predetermined similarity threshold, the server 53 can select a highest similarity greater than the predetermined similarity threshold, and determine that the face image information matches standard face image information corresponding to the highest similarity. As such, a candidate user corresponding to the standard face image information corresponding to the highest similarity is determined as user C1, and a user account corresponding to the candidate user is determined as the user account of user C1.

In still another case, when a highest similarity is greater than the predetermined similarity threshold, the server 53 further calculates a difference between the highest similarity and a second highest similarity, and determines, when the difference is greater than a predetermined confounding difference value, that standard face image information corresponding to the highest similarity matches the face image information, and that there is no other confounding standard face image information. As such, a candidate user corresponding to the standard face image information corresponding to the highest similarity is determined as user C1, and a user account corresponding to the candidate user is determined as the user account of user C1.

In the present implementation, the server 53 can determine the candidate users corresponding to the cashier device 52, these candidate users are users near the cashier device 52, and therefore a user who makes a payment by using another cashier device, or even a user who makes a payment in another store, etc. can be excluded. As such, the server 53 only needs to compare the face image information with standard face image information of a limited quantity of candidate users, so that the server 53 can make a one-to-one detailed comparison between the face image information and standard face image information of each candidate user. In comparison, in a face image information identification process in a related technology, one-to-many search is performed on an image information library that includes many pieces of face image information (for example, includes standard face image information corresponding to all user accounts registered with the server 53) for face image information to be identified, and then a detailed comparison is made on found face image information. It can be seen that in the face image information identification process in the present application, a complex operation such as search is not needed, thereby improving face image information identification efficiency, and a one-to-one detailed comparison instead of a one-to-many comparison is used in the entire process, especially the entire face image information identification process is completely implemented by the server 53 and does not need to be performed by cashier S1, thereby improving face image information identification accuracy and improving transaction security.

Step 612: The cashier device 52 performs a corresponding deduction operation on the determined user account.

In the present implementation, when the server 53 provides a payment function, the cashier device 52 can complete the deduction operation by performing an interactive operation with the server 53. Certainly, the cashier device 52 can also perform an interactive operation with another payment platform to complete the deduction operation.

Step 613: The server 53 separately sends a deduction success message to the cashier device 52 and the mobile phone 51.

In the present implementation, an electronic gate machine or a similar device can be further disposed near the cashier device 52. Before deduction is completed, the electronic gate machine can remain closed to prevent user C1 from taking the item 510 away without payment. After deduction is completed, for example, the cashier device 52 or the server 53 sends an open instruction (for example, the open instruction can be a dedicated instruction or the previous described deduction success message) to the electronic gate machine, so that the electronic gate machine switches to an open state, to let user C1 pass successfully.

In conclusion, based on the technical solutions of the present application, a user does not need to operate a user equipment because a cashier device can accurately learn of a user account of the user, and effectively and accurately implement a corresponding payment operation, thereby improving transaction efficiency and security and improving user experience.

Figure 8:
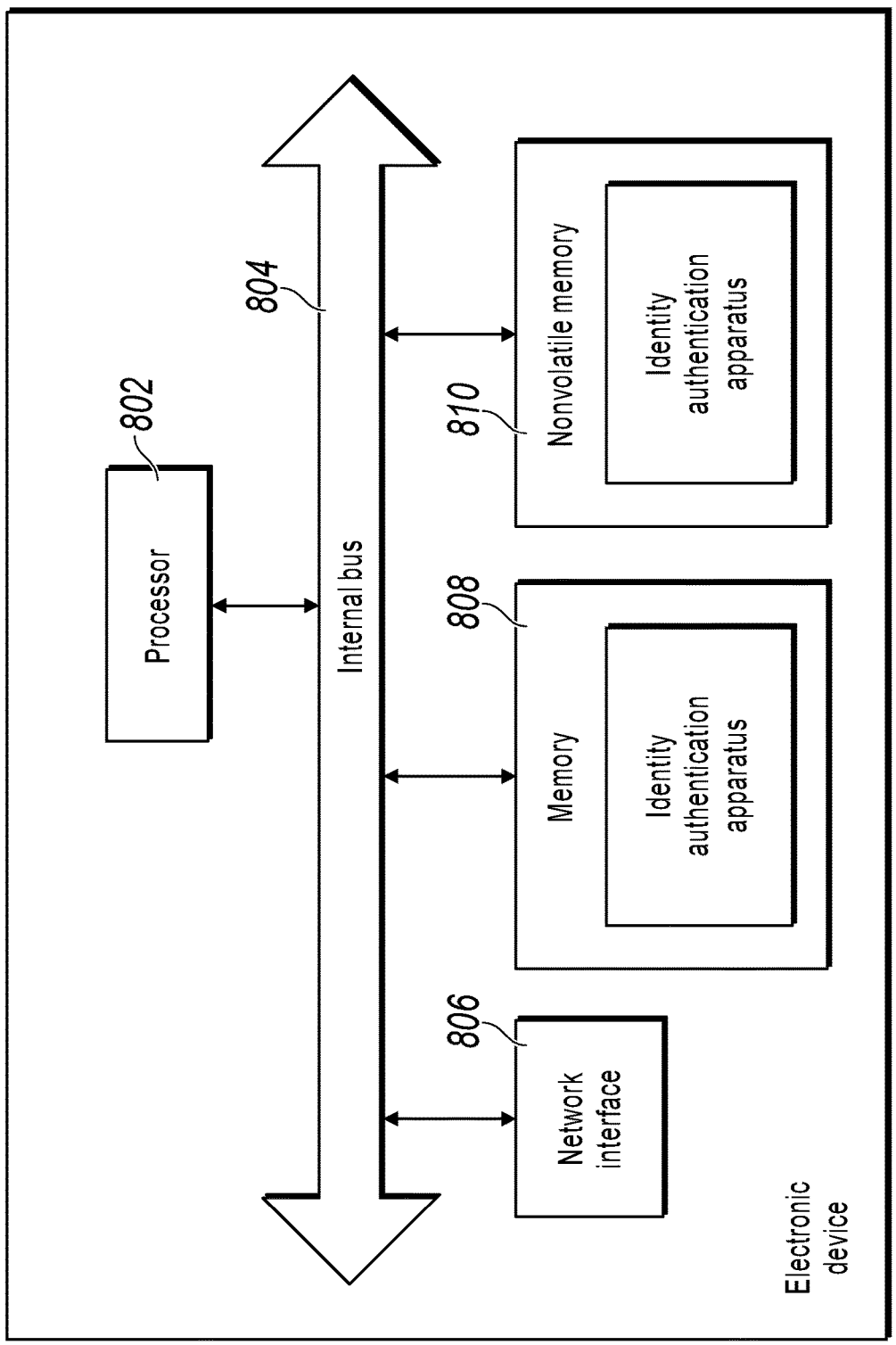
FIG. 8 is a schematic structural diagram illustrating an example of an electronic device on an interactive end side, according to an example implementation of the present application.

FIG. 8 is a schematic structural diagram illustrating an example of an electronic device on an interactive end side, according to an example implementation of the present application. Referring to FIG. 8, in terms of hardware, the electronic device includes a processor 802, an internal bus 804, a network interface 806, a memory 808, and a nonvolatile memory 810, and certainly can further include other hardware needed by a service. The processor 802 reads a corresponding computer program from the nonvolatile memory 810, writes the corresponding computer program into the memory 808, and then runs the corresponding computer program, to form a logical identity authentication device on an interactive end side. Certainly, in addition to a software implementation, another implementation is not excluded in the present application, for example, a logical device or a combination of hardware and software. In other words, an execution body of the following processing procedure is not limited to each logical unit, and can be hardware or a logical device.

Figure 9:
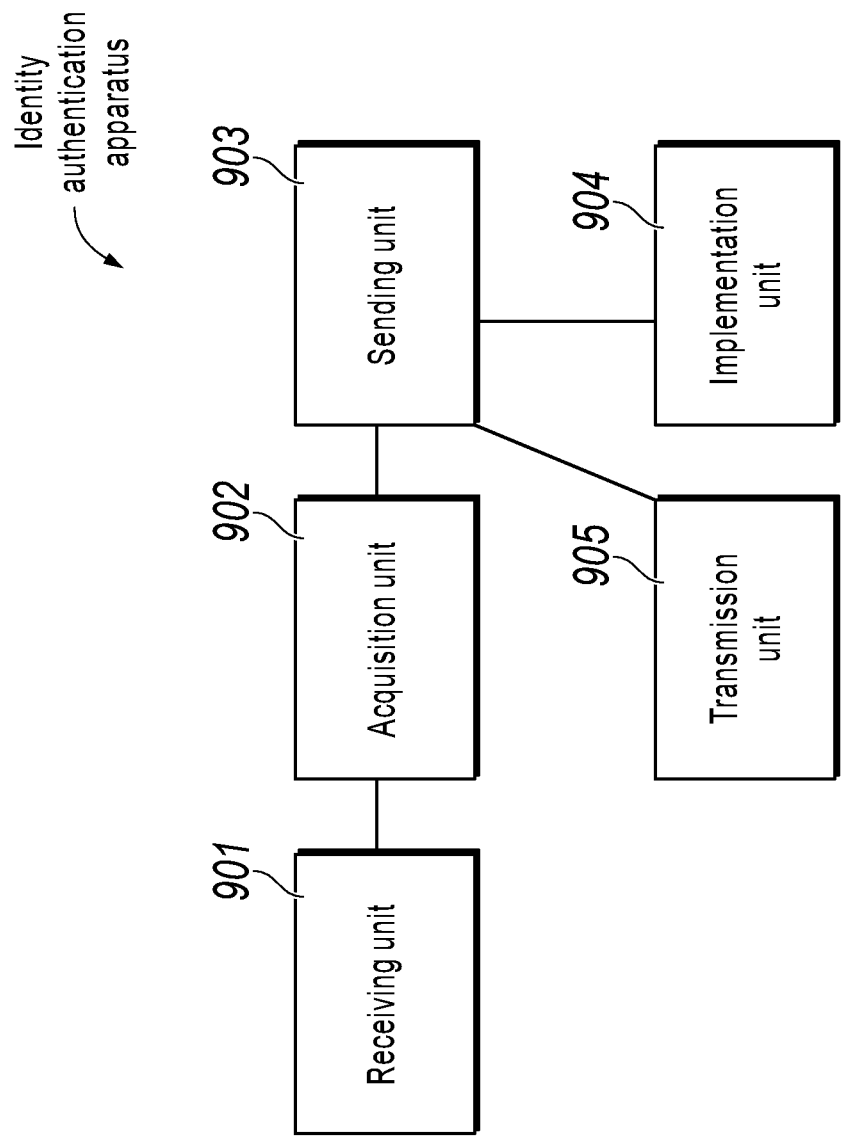
FIG. 9 is a block diagram illustrating an example of an identity authentication device on an interactive end side, according to an example implementation of the present application.

Referring to FIG. 9, in a software implementation, the identity authentication device can include: a receiving unit 901, configured to enable an interactive end to receive an interactive instruction initiated for a user; an acquisition unit 902, configured to enable the interactive end to obtain identity information of the user based on the interactive instruction; and a sending unit 903, configured to enable the interactive end to send an identification request to a server end, where the identification request includes the identity information, the identification request is used to instruct the server end to match the identity information against standard identity information of a candidate user corresponding to the interactive end, to determine a user account corresponding to the user, the user account is used to respond to an interactive operation corresponding to the interactive instruction, and a user near the interactive end is marked as a candidate user corresponding to the interactive end by the server end.

Optionally, the device further includes: an implementation unit 904, configured to enable the interactive end to perform an interactive operation on the determined user account in response to the interactive instruction, when the user account corresponding to the user is determined.

Optionally, the device further includes: a transmission unit 905, configured to enable the interactive end to transmit a near field message, where the near field message includes interactive-end identification information of the interactive end, where when the near field message is received by a client device corresponding to the user, the near field message is used to instruct the client device to send the interactive-end identification information, user identification information of the user, and signal strength of the near field message to the server end, so that the server end marks the user as a candidate user corresponding to the interactive end when the signal strength is greater than predetermined strength.

Optionally, the candidate user includes a user near the interactive end within a predetermined duration.

Optionally, the identity information includes biometric feature information, and the standard identity information includes standard biometric feature information.

Optionally, the biometric feature information and the standard biometric feature information each include at least one of the following: face information, fingerprint information, palm print information, eye print information, iris information, or gait information.

Figure 10:
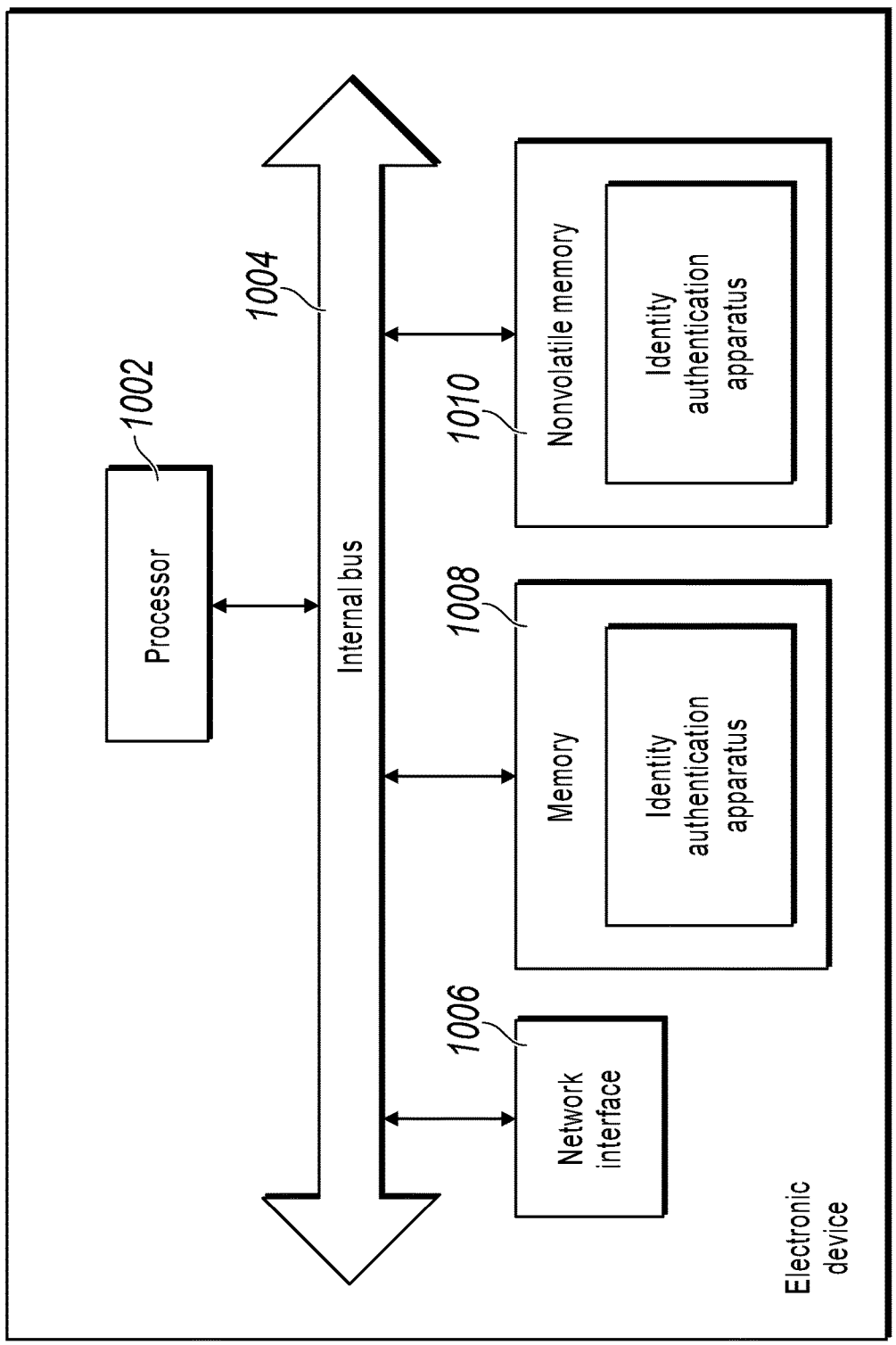
FIG. 10 is a schematic structural diagram illustrating an example of an electronic device on a server end side, according to an example implementation of the present application.

FIG. 10 is a schematic structural diagram illustrating an example of an electronic device on a server end side, according to an example implementation of the present application. Referring to FIG. 10, in terms of hardware, the electronic device includes a processor 1002, an internal bus 1004, a network interface 1006, a memory 1008, and a nonvolatile memory 1010, and certainly can further include other hardware needed by a service. The processor 1002 reads a corresponding computer program from the nonvolatile memory 1010, writes the corresponding computer program into the memory 1008, and then runs the corresponding computer program, to form a logical identity authentication device on a server end side. Certainly, in addition to a software implementation, another implementation is not excluded in the present application, for example, a logical device or a combination of hardware and software. In other words, an execution body of the following processing procedure is not limited to each logical unit, and can be hardware or a logical device.

Figure 11:
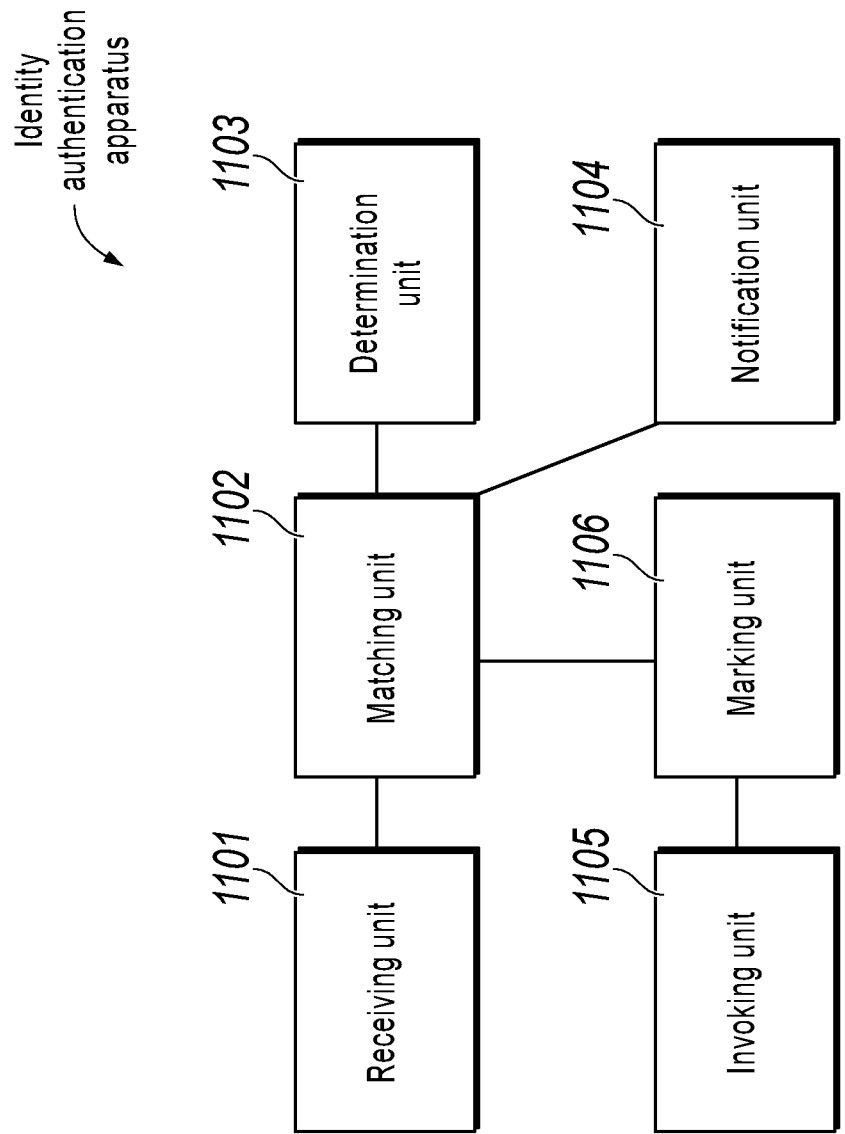
FIG. 11 is a block diagram illustrating an example of an identity authentication device on a server end side, according to an example implementation of the present application.

Referring to FIG. 11, in a software implementation, the identity authentication device can include: a receiving unit 1101, configured to enable a server end to receive an identification request sent by an interactive end, where the identification request includes identity information of a user, and the identity information is obtained by the interactive end from the user based on an interactive instruction initiated for the user; a matching unit 1102, configured to enable the server end to match the identity information against standard identity information of a candidate user corresponding to the interactive end, where a user near the interactive end is marked as a candidate user corresponding to the interactive end by the server end; and a determination unit 1103, configured to enable the server end to determine a user account corresponding to the candidate user when the identity information matches the standard identity information corresponding to the candidate user, where the user account is used to respond to an interactive operation corresponding to the interactive instruction.

Optionally, the device further includes: a notification unit 1104, configured to enable the server end to notify the interactive end of the user account, so that the interactive end performs an interactive operation on the user account in response to the interactive instruction.

Optionally, the device further includes: an invoking unit 1105, configured to enable the server end to invoke a database, where the database records interactive-end identification information, user identification information, and signal strength that are uploaded by a client device corresponding to the user, and when receiving a near field message transmitted by the interactive end, the client device uploads the user identification information of the user, the interactive-end identification information of the interactive end that is included in the near field message, and the signal strength of the near field message to the server end for recording in the database; and a marking unit 1106, configured to enable the server end to receive the interactive-end identification information, the user identification information, and the signal strength that are uploaded by the client device, and mark the user as a candidate user corresponding to the interactive end when the signal strength is greater than predetermined strength.

Optionally, the candidate user includes a user near the interactive end within a predetermined duration.

Optionally, the matching unit 1102 is configured to: enable the server end to match the identity information against standard identity information corresponding to each candidate user to obtain a corresponding similarity, where when a highest similarity is greater than a predetermined similarity threshold, and a difference between the highest similarity and a second highest similarity is greater than a predetermined confounding difference value, it is determined that a candidate user corresponding to the highest similarity matches the user.

Figure 12:
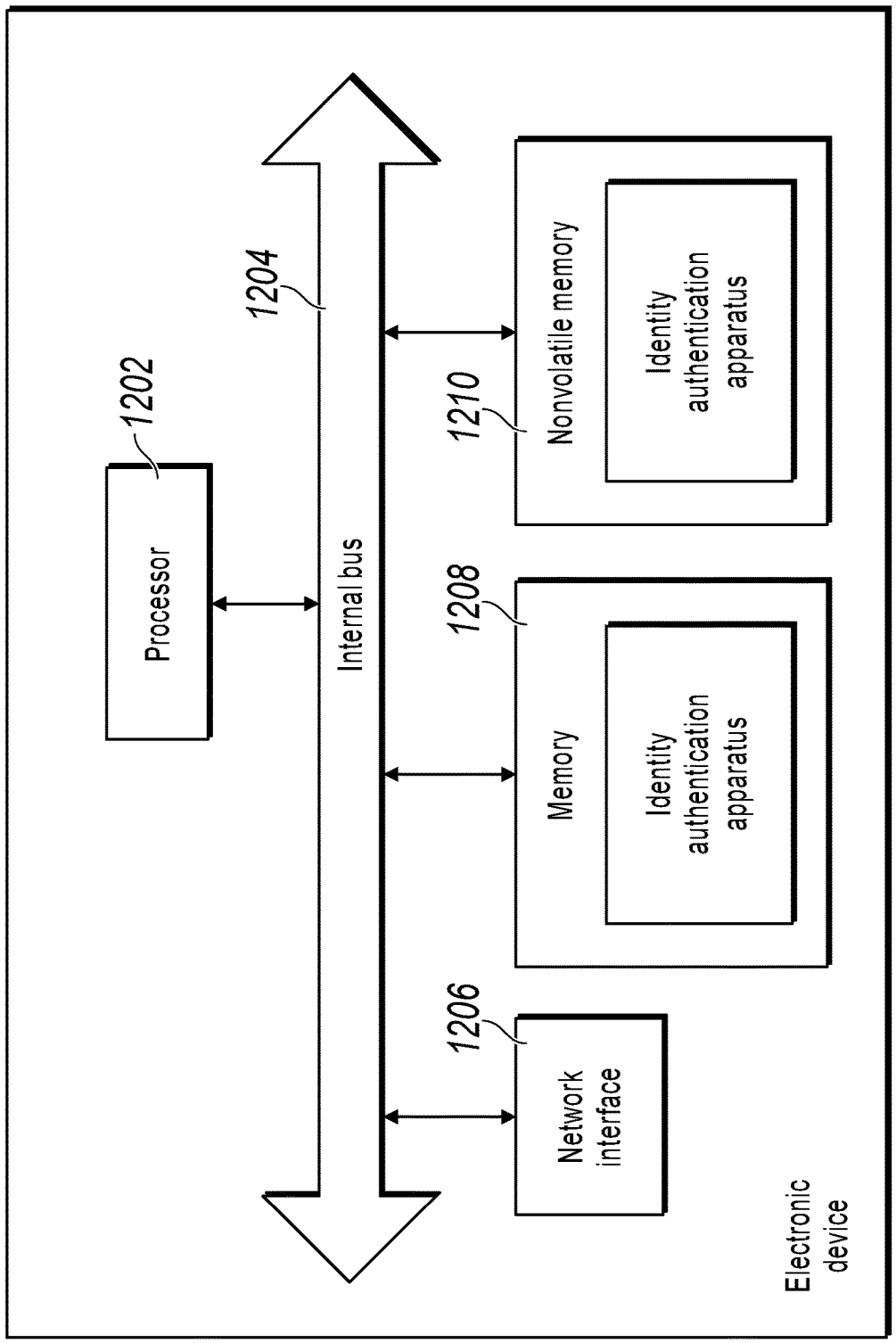
FIG. 12 is a schematic structural diagram illustrating an example of an electronic device on a client device side, according to an example implementation of the present application.

FIG. 12 is a schematic structural diagram illustrating an example of an electronic device on a client device side, according to an example implementation of the present application. Referring to FIG. 12, in terms of hardware, the electronic device includes a processor 1202, an internal bus 1204, a network interface 1206, a memory 1208, and a nonvolatile memory 1210, and certainly can further include other hardware needed by a service. The processor 1202 reads a corresponding computer program from the nonvolatile memory 1210, writes the corresponding computer program into the memory 1208, and then runs the corresponding computer program, to form a logical identity authentication device on a client device side. Certainly, in addition to a software implementation, another implementation is not excluded in the present application, for example, a logical device or a combination of hardware and software. In other words, an execution body of the following processing procedure is not limited to each logical unit, and can be hardware or a logical device.

Figure 13:
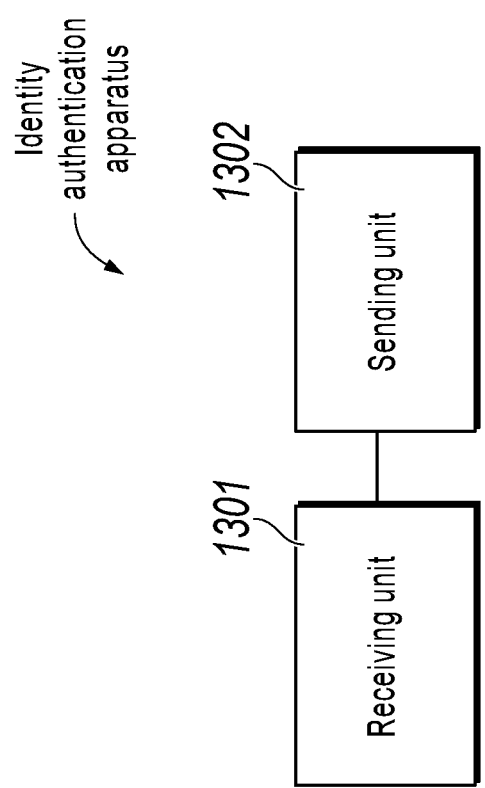
FIG. 13 is a block diagram illustrating an example of an identity authentication device on a client device side, according to an example implementation of the present application.

Referring to FIG. 13, in a software implementation, the identity authentication device can include: a receiving unit 1301, configured to enable a client device to receive a near field message transmitted by an interactive end, where the near field message includes interactive-end identification information of the interactive end; and a sending unit 1302, configured to enable the client device to send the interactive-end identification information, user identification information of a logged-in user of the client device, and signal strength of the near field message to a server end, so that the server end marks the logged-in user as a candidate user corresponding to the interactive end when the signal strength is greater than predetermined strength, where when the interactive end obtains an interactive instruction for the logged-in user, identity information of the logged-in user is obtained by the interactive end and is sent to the server end, so that the server end matches the identity information against standard identity information corresponding to the candidate user, and determines a user account corresponding to the logged-in user, where the user account is used to respond to an interactive operation corresponding to the interactive instruction.

The system, device, module, or unit illustrated in the previous implementations can be implemented by using a computer chip or an entity, or can be implemented by using a product with a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination thereof.

In a typical configuration, the computer includes one or more processors (CPU), one or more input/output interfaces, one or more network interfaces, and one or more memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

For example, the present application provides a computer readable medium. A computer instruction is stored on the computer readable medium. When the instruction is executed by a processor, the previous identity authentication method on the interactive end side is implemented.

For example, the present application provides another computer readable medium. A computer instruction is stored on the computer readable medium. When the instruction is executed by a processor, the previous identity authentication method on the server end side is implemented.

For example, the present application provides still another computer readable medium. A computer instruction is stored on the computer readable medium. When the instruction is executed by a processor, the previous identity authentication method on the client device side is implemented.

The computer readable medium includes persistent, non-persistent, removable, and irremovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in the present specification, the computer readable medium does not include computer-readable transitory media such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. An element described by "includes a . . . " further includes, without more constraints, another same or identical element in the process, method, article, or device that includes the element.

Example implementations are described in detail here, and examples of the example implementations are presented in the accompanying drawings. When the following description relates to the accompanying drawings, unless otherwise specified, same numbers in different accompanying drawings represent same or similar elements. Implementations described in the following example implementations do not represent all implementations consistent with the present application. Instead, they are only examples of devices and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present application to describe various types of information, the information is not limited to the terms. These terms are only used to distinguish between information of a same type. For example, without departing from the scope of the present application, first information can also be referred to as second information, and similarly, the second information can be referred to as the first information. Depending on the context, for example, the word "if" used here can be explained as "while", "when", or "in response to determining".

The previous descriptions are merely example implementations of the present application, but are not intended to limit the present application. Any modification, equivalent replacement, or improvement made without departing from the spirit and principle of the present application should fall within the protection scope of the present application.

Figure 14:
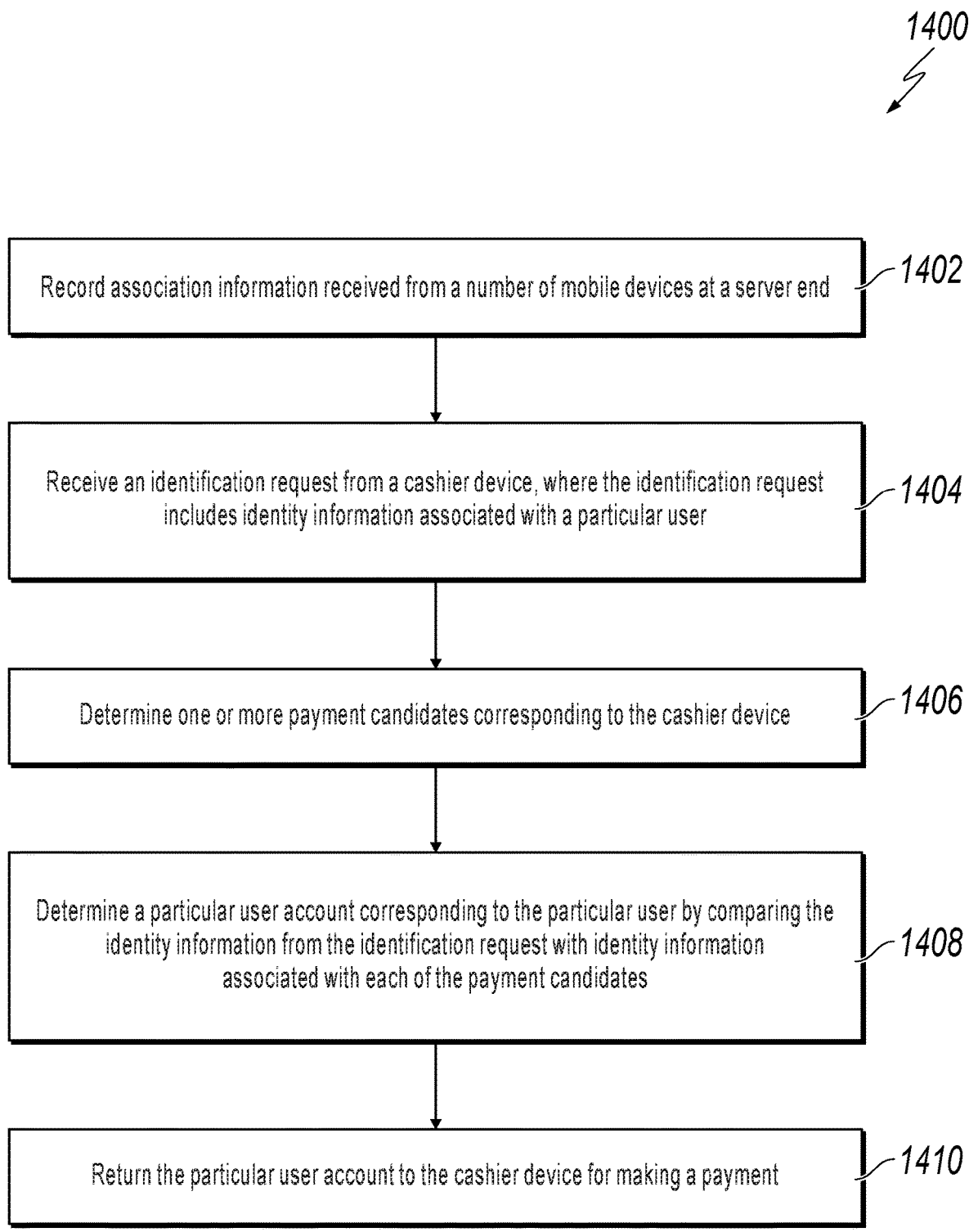
FIG. 14 is a flowchart illustrating an example of a computer-implemented method for identity authentication, according to an implementation of the present disclosure.

FIG. 14 is a flowchart illustrating an example of a computer-implemented method 1400 for identity authentication, according to an implementation of the present disclosure. For clarity of presentation, the description that follows generally describes method 1400 in the context of the other figures in this description. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

At 1402, association information received from a number of mobile devices is recorded at a server end, where each mobile device is associated with a user that is pre-registered with the server end.

In some implementations, pre-registering a user includes associating a user account of the user with standard identification information associated with the user; and recording the user account and the standard identity information in the server end.

In some implementations, recording association information received from a plurality of mobile devices includes receiving association information from a user device of a registered user, wherein the association information includes identification information associated with the cashier device, user identity information associated with the pre-registered user, and a signal strength, where the identification information is carried in a near field message that is transmitted to the mobile device from the cashier device, and where the signal strength indicates the strength of the near field message; and recording the association information in a database associated with the server end. In such implementations, method 1400 further includes removing the recorded association information from the database after a predetermined duration. After 1402, method 1400 proceeds to 1404.

At 1404, an identification request is received at the server end and from a cashier device, where the identification request includes identity information associated with a particular user. In some implementations, the identification information is obtained by the cashier device from a mobile device of the user based on an interactive instruction initiated for the mobile device. After 1404, method 1400 proceeds to 1406.

At 1406, one or more payment candidates corresponding to the cashier device are determined by the server end.

In some implementations, determining one or more payment candidates corresponding to the cashier device includes retrieving particular association information associated with a registered user and corresponding to the cashier device from the database; identifying a signal strength included in the association information; comparing the signal strength with a predetermined strength value; and determining that the registered user corresponding to the particular association information is a payment candidate if the particular association information includes a signal strength greater than the predetermined strength value. After 1406, method 1400 proceeds to 1408.

At 1408, a particular user account corresponding to the particular user is determined by the server end by comparing the identity information from the identification request with identity information associated with each of the payment candidates.

In some implementations, determining the user account corresponding to the particular user includes calculating, for each payment candidate, a similarity by comparing the identity information associated with the particular user with the identity information associated with that payment candidate; determining whether a highest similarity is greater than a predetermined similarity threshold; if the highest similarity is greater than the predetermined similarity threshold, determining whether a difference between the highest similarity and a second highest similarity is greater than a predetermined confounding difference value; if the difference between the highest similarity and the second highest similarity is greater than the predetermined confounding difference value, determining, as the user account corresponding to the particular user, a payment candidate user account associated with a payment candidate corresponding to the highest similarity. After 1408, method 1400 proceeds to 1410.

At 1410, the particular user account is returned by the server end to the cashier device for making a payment. After 1410, method 1400 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    transmitting, by an interactive end device that executes an interactive end side of an application that provides an interactive function, and to a user device that is associated with a user, a near field message comprising information that identifies the interactive end device;
    in response to:
        the user device repeatedly transmitting, to a server end device that executes a server end side of the application that provides the interactive function, association information that comprises the information that identifies the interactive end device and a signal strength of the near field message in response to the near field message; and
        the server end device repeatedly determining the near field message being greater than a predetermined strength and repeatedly marking a user for the interactive function being performed in a user account:
    obtaining, by the interactive end device that executes the interactive end side of the application that provides the interactive function, transaction information for a transaction that was initiated at the interactive end device on behalf of the user in response to receiving a determination from the server end device that associates the user with the interactive end device based on the signal strength of the near field message being greater than the predetermined strength;
    in response to obtaining the transaction information for the transaction that was initiated at the interactive end device on behalf of the user, obtaining, by a sensor of the interactive end device, biometric feature information that identifies the user;
    transmitting, by the interactive end device that executes the interactive end side of the application that provides the interactive function, and to the server end device that executes the server end side of the application that provides the interactive function, an identification request for the server end device to determine a user account corresponding to the user based on the biometric feature information that identifies the user; and
    performing, by the interactive end device that executes the interactive end side of the application that provides the interactive function, the interactive function on the user account corresponding to the user that was determined by the server end device.

2. The computer-implemented method of claim 1, wherein association information comprises second information that identifies the user and a signal strength indicator associated with the near field message.

3. The computer-implemented method of claim 1, wherein the interactive function is performed on the user account by the interactive end device in response to the server end device determining that a signal strength indicator included in the association information exceeds a threshold strength.

4. The computer-implemented method of claim 1, wherein the biometric feature information that identifies the user comprises face image information, fingerprint information, palm print information, eye print information, iris information, or gait information.

5. The computer-implemented method of claim 1, comprising:
    receiving, by the interactive end device and from the server end device, information identifying the determined user account.

6. The computer-implemented method of claim 1, wherein the interactive end device comprises a cashier device; and
    wherein the interactive function comprises an account deduction operation.

7. The computer-implemented method of claim 1, comprising:
    transmitting, by the interactive end device and to the server end device, a request to at least partially perform the interactive function.

8. A non-transitory, computer-readable medium storing one or more instructions executable by a computer system to perform operations comprising:
    transmitting, by an interactive end device that executes an interactive end side of an application that provides an interactive function, and to a user device that is associated with a user, a near field message comprising information that identifies the interactive end device;
    in response to:
        the user device repeatedly transmitting, to a server end device that executes a server end side of the application that provides the interactive function, association information that comprises the information that identifies the interactive end device and a signal strength of the near field message in response to the near field message; and
        the server end device repeatedly determining the near field message being greater than a predetermined strength and repeatedly marking a user for the interactive function being performed in a user account:
    obtaining, by the interactive end device that executes the interactive end side of the application that provides the interactive function, transaction information for a transaction that was initiated at the interactive end device on behalf of the user in response to receiving a determination from the server end device that associates the user with the interactive end device based on the signal strength of the near field message being greater than the predetermined strength;

in response to obtaining the transaction information for the transaction that was initiated at the interactive end device on behalf of the user, obtaining, by a sensor of the interactive end device, biometric feature information that identifies the user;

transmitting, by the interactive end device that executes the interactive end side of the application that provides the interactive function, and to the server end device that executes the server end side of the application that provides the interactive function, an identification request for the server end device to determine a user account corresponding to the user based on the biometric feature information that identifies the user; and performing, by the interactive end device that executes the interactive end side of the application that provides the interactive function, the interactive function on the user account corresponding to the user that was determined by the server end device.

9. The medium of claim 8, wherein association information comprises second information that identifies the user and a signal strength indicator associated with the near field message.

10. The medium of claim 8, wherein the interactive function is performed on the user account by the interactive end device in response to the server end device determining that a signal strength indicator included in the association information exceeds a threshold strength.

11. The medium of claim 8, wherein the biometric feature information that identifies the user comprises face image information, fingerprint information, palm print information, eye print information, iris information, or gait information.

12. The medium of claim 8, wherein the operations comprise:
receiving, by the interactive end device and from the server end device, information identifying the determined user account.

13. The medium of claim 8, wherein the interactive end device comprises a cashier device; and
wherein the interactive function comprises an account deduction operation.

14. The medium of claim 8, wherein the operations comprise:
transmitting, by the interactive end device and to the server end device, a request to at least partially perform the interactive function.

15. A computer-implemented system comprising: one or more computers; and
one or more computer memory devices interoperably coupled with the one or more computers and having tangible, non-transitory, machine-readable media storing one or more instructions that, when executed by the one or more computers, perform one or more operations comprising:
transmitting, by an interactive end device that executes an interactive end side of an application that provides an interactive function, and to a user device that is associated with a user, a near field message comprising information that identifies the interactive end device;
in response to:
the user device repeatedly transmitting, to a server end device that executes a server end side of the application that provides the interactive function, association information that comprises the information that identifies the interactive end device and a signal strength of the near field message in response to the near field message; and
the server end device repeatedly determining the near field message being greater than a predetermined strength and repeatedly marking a user for the interactive function being performed in a user account:
obtaining, by the interactive end device that executes the interactive end side of the application that provides the interactive function, transaction information for a transaction that was initiated at the interactive end device on behalf of the user in response to receiving a determination from the server end device that associates the user with the interactive end device based on the signal strength of the near field message being greater than the predetermined strength;
in response to obtaining the transaction information for the transaction that was initiated at the interactive end device on behalf of the user, obtaining, by a sensor of the interactive end device, biometric feature information that identifies the user;
transmitting, by the interactive end device that executes the interactive end side of the application that provides the interactive function, and to the server end device that executes the server end side of the application that provides the interactive function, an identification request for the server end device to determine a user account corresponding to the user based on the biometric feature information that identifies the user; and
performing, by the interactive end device that executes the interactive end side of the application that provides the interactive function, the interactive function on the user account corresponding to the user that was determined by the server end device.

16. The system of claim 15, wherein association information comprises second information that identifies the user and a signal strength indicator associated with the near field message.

17. The system of claim 15, wherein the interactive function is performed on the user account by the interactive end device in response to the server end device determining that a signal strength indicator included in the association information exceeds a threshold strength.

18. The system of claim 15, wherein the biometric feature information that identifies the user comprises face image information, fingerprint information, palm print information, eye print information, iris information, or gait information.

19. The system of claim 15, wherein the operations comprise:
receiving, by the interactive end device and from the server end device, information identifying the determined user account.

20. The system of claim 15, wherein the interactive end device comprises a cashier device; and
wherein the interactive function comprises an account deduction operation.

* * * * *